(12) United States Patent
Hormis et al.

(10) Patent No.: US 11,012,201 B2
(45) Date of Patent: May 18, 2021

(54) WIDEBAND QUADRATURE ERROR DETECTION AND CORRECTION

(71) Applicant: Analog Devices, Inc., Norwood, MA (US)

(72) Inventors: Raju Hormis, New York, NY (US); Steven R. Bal, Cary, NC (US); Antonio Montalvo, Raleigh, NC (US); David J. McLaurin, Durham, NC (US); Martin McCormick, Boston, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 14/340,461

(22) Filed: Jul. 24, 2014

(65) Prior Publication Data

US 2015/0030103 A1 Jan. 29, 2015

Related U.S. Application Data

(60) Provisional application No. 61/858,534, filed on Jul. 25, 2013.

(51) Int. Cl.
*H04L 1/24* (2006.01)
*H04L 27/36* (2006.01)

(52) U.S. Cl.
CPC ............ *H04L 1/243* (2013.01); *H04L 27/364* (2013.01)

(58) Field of Classification Search
CPC ........ H04B 17/11; H04B 17/24; H04B 17/21; H04L 27/364; H04L 27/3863; H04L 1/243
See application file for complete search history.

(56) References Cited

U.S. PATENT DOCUMENTS

| 5,293,406 | A | * | 3/1994 | Suzuki | 375/295 |
| 5,705,949 | A |  | 1/1998 | Alelyunas et al. |  |
| 6,977,977 | B1 | * | 12/2005 | Dubrovin et al. | 375/346 |
| 7,181,205 | B1 | * | 2/2007 | Scott | H04W 24/00 455/423 |
| 7,382,297 | B1 | * | 6/2008 | Kopikare | H03C 5/00 341/118 |

(Continued)

FOREIGN PATENT DOCUMENTS

| EP | 2367332 | 9/2011 |
| EP | 2367332 A1 | 9/2011 |

(Continued)

OTHER PUBLICATIONS

IEEE 100 The Authoritative Dictionary of IEEE Standards Terms, Seventh Edition (Year: 2000).*

(Continued)

*Primary Examiner* — Aristocratis Fotakis
(74) *Attorney, Agent, or Firm* — Knobbe, Martens, Olson & Bear, LLP

(57) ABSTRACT

A transmission module is provided that includes a transmitter, a loopback receiver, and a QEC controller. The QEC controller identifies quadrature imbalance in the transmitter based at least one a comparison of the data signals at the output of the loopback receiver with data signals at the input of the transmitter. Based on the comparison, the QEC controller can adjust one or more characteristics of the transmitter to correct quadrature errors in the transmitter.

26 Claims, 10 Drawing Sheets

(56) References Cited

U.S. PATENT DOCUMENTS

| | | | |
|---|---|---|---|
| 7,856,048 B1* | 12/2010 | Smaini | H04B 1/40 330/2 |
| 7,894,555 B2 | 2/2011 | Lindoff et al. | |
| 7,944,984 B1* | 5/2011 | Wu | H04L 27/364 375/261 |
| 8,036,317 B2 | 10/2011 | D'Alessandro | |
| 8,290,450 B2 | 10/2012 | Hammerschmidt et al. | |
| 8,331,506 B2 | 12/2012 | Park et al. | |
| 8,509,298 B2 | 8/2013 | Hormis | |
| 8,706,062 B1* | 4/2014 | Yu | H03F 1/3223 455/126 |
| 8,861,644 B2* | 10/2014 | Chen et al. | 375/308 |
| 9,300,444 B2 | 3/2016 | Hormis et al. | |
| 9,444,560 B1* | 9/2016 | Goh | H04L 1/243 |
| 9,882,661 B1* | 1/2018 | Gross | H04B 17/21 |
| 2001/0022532 A1 | 9/2001 | Dolman | |
| 2003/0174783 A1* | 9/2003 | Rahman | H04L 27/0014 375/298 |
| 2004/0092241 A1 | 5/2004 | Kim et al. | |
| 2004/0166815 A1* | 8/2004 | Maligeorgos | H03L 7/085 455/73 |
| 2004/0198340 A1* | 10/2004 | Lee | H04B 17/0085 455/423 |
| 2005/0069050 A1* | 3/2005 | Ding et al. | 375/296 |
| 2005/0260949 A1 | 11/2005 | Kiss et al. | |
| 2006/0062324 A1 | 3/2006 | Masashi et al. | |
| 2006/0121858 A1 | 6/2006 | Tanaka et al. | |
| 2006/0215783 A1 | 9/2006 | Shako et al. | |
| 2007/0211822 A1* | 9/2007 | Olesen et al. | 375/299 |
| 2007/0263745 A1* | 11/2007 | Hayase et al. | 375/267 |
| 2007/0286307 A1* | 12/2007 | Hayashi et al. | 375/297 |
| 2008/0166985 A1* | 7/2008 | Wortel et al. | 455/233.1 |
| 2008/0195920 A1* | 8/2008 | Luce et al. | 714/798 |
| 2009/0028231 A1* | 1/2009 | Lee | H04L 27/364 375/226 |
| 2009/0224828 A1 | 9/2009 | Hideharu et al. | |
| 2009/0233562 A1* | 9/2009 | Kim | H04B 17/14 455/115.1 |
| 2009/0240917 A1* | 9/2009 | Fitton | G06F 17/16 712/36 |
| 2009/0325516 A1* | 12/2009 | Safavi | H04L 27/364 455/126 |
| 2010/0119012 A1* | 5/2010 | Pal | 375/324 |
| 2010/0316163 A1* | 12/2010 | Forenza et al. | 375/296 |
| 2011/0013724 A1* | 1/2011 | Metreaud | H04L 27/0014 375/296 |
| 2011/0069767 A1* | 3/2011 | Zhu | H04L 27/3863 375/259 |
| 2011/0075715 A1* | 3/2011 | Kravitz | H04B 1/30 375/221 |
| 2012/0087451 A1 | 4/2012 | Razzell | |
| 2012/0126821 A1* | 5/2012 | Forstner | G01R 31/3187 324/537 |
| 2012/0314784 A1 | 12/2012 | Pratt et al. | |
| 2013/0021048 A1* | 1/2013 | Peng | G01R 31/2822 324/750.3 |
| 2013/0272175 A1* | 10/2013 | Zargari | H04L 5/14 370/281 |
| 2014/0154997 A1* | 6/2014 | Chen et al. | 455/67.14 |
| 2014/0270001 A1 | 9/2014 | Schubert et al. | |
| 2014/0270002 A1 | 9/2014 | Schubert et al. | |
| 2014/0273902 A1 | 9/2014 | An et al. | |
| 2015/0030103 A1 | 1/2015 | Hormis et al. | |
| 2016/0033563 A1* | 2/2016 | Needham | G01R 27/28 324/76.23 |
| 2016/0359614 A1* | 12/2016 | Hao | H04L 7/033 |

FOREIGN PATENT DOCUMENTS

| | | |
|---|---|---|
| RU | 2011123470 | 1/2013 |
| RU | 2011123470 A | 1/2013 |
| WO | 2014145350 A1 | 9/2014 |
| WO | WO 2014/145350 | 9/2014 |

OTHER PUBLICATIONS

Narasimhan et al., "Digital Compensation of Tx/Rx I/Q Imbalance in TD-SCDMA Systems," Global Telecommunication Conference (Globecom) 2011, IEEE, Dec. 5, 2011, pp. 1-5.

International Search Report and Written Opinion received in PCT Application No. PCT/US2014/030091, dated Jul. 10, 2014, six pages.

Office Action received in Chinese Patent Application No. 201410357371.5, dated Aug. 5, 2016, two pages.

Extended European Search Report received in European Patent Application No. 14177874.6, dated Jan. 29, 2015; in 7 pages.

International Search Report and Written Opinion received in PCT Application No. PCT/US2014/030091, dated Jul. 10, 2014, 6 pages.

Narasimhan et al., "Digital Compensation ofTx/Rx I/Q Imbalance in TD-SCOMA Systems," Global Telecommunication Conference (Globecom) 2011, IEEE, Dec. 5, 2011, pp. 1-5.

\* cited by examiner

WIDEBAND QUADRATURE ERROR DETECTION AND CORRECTION

CROSS-REFERENCE TO RELATED APPLICATIONS

This application claims priority to U.S. Prov. App. No. 61/858,534, filed Jul. 25, 2013, and is related to U.S. application Ser. No. 13/951,341, filed Jul. 25, 2013; U.S. Prov. App. No. 61/786,393, filed Mar. 15, 2013; U.S. Prov. App. No. 61/786,469, filed Mar. 15, 2013; and U.S. application Ser. No. 13/897,719 filed May 20, 2013, each of which is hereby incorporated herein by reference in its entirety.

BACKGROUND

1. Field

Embodiments of the disclosure relate to electronic devices, and more particularly, in one or more embodiments, to wireless transmitters

2. Description of the Related Technology

Transmitters for wireless infrastructure (e.g., cellular base stations) have traditionally been implemented using super-heterodyne or complex intermediate frequency (IF) architectures. Implementing a wireless transmitter (TX) using a direct conversion architecture instead of a super-heterodyne architecture can reduce overall system cost and size through integration and the use of fewer components. However, several issues can arise with the use of direct conversion wireless transmitters.

Direct conversion transmitters (TX) include 7an in-phase (I) and quadrature phase (Q) baseband path, each driving a mixer also driven by a local oscillator (LO) signal having a frequency about equal to the desired radio frequency (RF) center frequency. The I-path mixer LO signal and Q-path mixer LO signal are 90 degrees out of phase (sine and cosine), and the mixer outputs are summed at RF. Any mismatch in the amplitude of the I or Q path (amplitude error), or any deviation of the phase difference of the two paths from 90 degrees (phase error) is referred to collectively as quadrature error or a quadrature imbalance. Quadrature errors can result in an undesired sideband (USB), in which a desired signal at some frequency offset from the carrier will have an undesired image at the negative of that offset frequency. This image is considered an undesired emission, and acceptable levels of undesired emissions are determined by various wireless standards.

In some instances, for multi-carrier (MC) base station applications, a direct conversion TX is required to have very low undesired sideband levels (e.g., less than −75 dBm/Hz), which can be achieved through a calibration process called quadrature error correction (QEC).

Some QEC processes observe the transmit signal alone (blind algorithms) and assume zero correlation between the I and Q TX signals when the undesired sideband has been eliminated. Such blind QEC algorithms are based on the assumption that transmitted signals satisfy a statistical properness condition. For example, a transmitted complex baseband signal x(n), indexed by integer n, can be said to be proper when Equation 1 is satisfied:

$$E[x(n)x(n+d)]=0, \forall d, \quad (1)$$

where y(n) is the observed complex baseband signal and d is an integer time-advance or time-lag. For the case when d=0, the expression in Equation 1 can also be referred to as a circular symmetry condition. For signals that would otherwise satisfy Equation 1 prior to transmission, an analog I/Q imbalance can destroy this condition.

However, digital pre-distortion (DPD), which is used in base stations to improve power amplifier (PA) efficiency, can create correlation between the I and Q TX signals. Thus, for blind QEC processes, the DPD-related correlation can be falsely detected as a quadrature error, and limit the minimum achievable undesired sideband.

To further complicate QEC, quadrature errors in the transmitter can vary with baseband frequency due to baseband filter mismatch, DAC clock skew, etc. In addition, placing the transmitter offline to complete the calibration process is undesirable as it can lead to dropped calls and other undesirable side effects.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include quadrature error correction of data signals.

One innovative aspect of the present disclosure provides an apparatus. The apparatus includes a transmitter. The apparatus further includes a loopback receiver. The apparatus further includes a controller configured to receive a first data signal from the loopback receiver. The controller is further configured to identify an in-phase/quadrature-phase imbalance in the transmitter based at least on a comparison of the first data signal received from the loopback receiver with a buffered data signal that corresponds to a data signal received by the transmitter as an input. The controller is further configured to correct the in-phase/quadrature-phase imbalance present in the transmitter based at least in part on the comparison of the first data signal received from the loopback receiver with the buffered data signal.

In various embodiments, the controller can be configured to identify the in-phase/quadrature-phase based on a cross-covariance of the first data signal received from the loopback receiver and the buffered data signal that corresponds to a data signal received by the transmitter. In various embodiments, the controller can be configured to estimate low-rank signals using singular value decomposition.

In various embodiments, the controller can be further configured to generate a precoder matrix configured to correct the I/Q imbalances. In various embodiments, the controller configured to generate the precoder matrix based on a cross-covariance of the data signal received from the loopback receiver and the buffered data signal that corresponds to a data signal received by the transmitter.

In various embodiments, the controller can be further configured to generate at least one of a gain correction, phase correction, or group delay correction parameter. In various embodiments, the controller can be configured to generate at least one of the gain correction, phase correction, or group delay correction parameter based on a minimum mean square error (MMSE) channel estimate. In various embodiments, the controller can be configured to generate at least one of the gain correction, phase correction, or group delay correction parameter based on a parameterized linear transformation.

Another aspect provides an electronically-implemented method of quadrature error correction. The method includes receiving a first data signal from a loopback receiver. The method further includes identifying an in-phase/quadrature-phase imbalance in the transmitter based at least on a comparison of the first data signal received from the loopback receiver with a buffered data signal that corresponds to a data signal received by the transmitter. The method further includes correcting the in-phase/quadrature-phase imbalance present in the transmitter based at least in part on the comparison of the first data signal received from the loopback receiver with the buffered data signal.

In various embodiments, the method can further include identifying the in-phase/quadrature-phase based on a cross-covariance of the first data signal received from the loopback receiver and the buffered data signal that corresponds to a data signal received by the transmitter. In various embodiments, the method can further include estimating low-rank signals using singular value decomposition.

In various embodiments, the method can further include generating a precoder matrix configured to correct the I/Q imbalances. In various embodiments, the method can further include generating the precoder matrix based on a cross-covariance of the data signal received from the loopback receiver and the buffered data signal that corresponds to a data signal received by the transmitter.

In various embodiments, the method can further include generating at least one of a gain correction, phase correction, or group delay correction parameter. In various embodiments, the method can further include generating at least one of the gain correction, phase correction, or group delay correction parameter based on a minimum mean square error (MMSE) channel estimate. In various embodiments, the method can further include generating at least one of the gain correction, phase correction, or group delay correction parameter based on a parameterized linear transformation.

Another aspect provides another apparatus. The apparatus includes a transmitter. The apparatus further includes a loopback receiver. The apparatus further includes a means for quadrature error correction. The means for quadrature error correction includes a means for receiving a first data signal from the loopback receiver that corresponds to a second data signal generated by the transmitter as an output. The means for quadrature error correction further includes a means for identifying an in-phase/quadrature-phase imbalance in the transmitter based at least on a comparison of the first data signal received from the loopback receiver with a buffered data signal that corresponds to a data signal received by the transmitter. The means for quadrature error correction further includes a means for correcting the in-phase/quadrature-phase imbalance present in the transmitter based at least in part on the comparison of the first data signal received from the loopback receiver with the buffered data signal.

Another aspect provides a non-transitory computer-readable medium. The medium includes code that, when executed, causes an apparatus to receive a first data signal from a loopback receiver. The medium further includes code that, when executed, causes the apparatus to identify an in-phase/quadrature-phase imbalance in the transmitter based at least on a comparison of the first data signal received from the loopback receiver with a buffered data signal that corresponds to a data signal received by the transmitter. The medium further includes code that, when executed, causes the apparatus to correct the in-phase/quadrature-phase imbalance present in the transmitter based at least in part on the comparison of the first data signal received from the loopback receiver with the buffered data signal.

DETAILED DESCRIPTION

Figure 1:
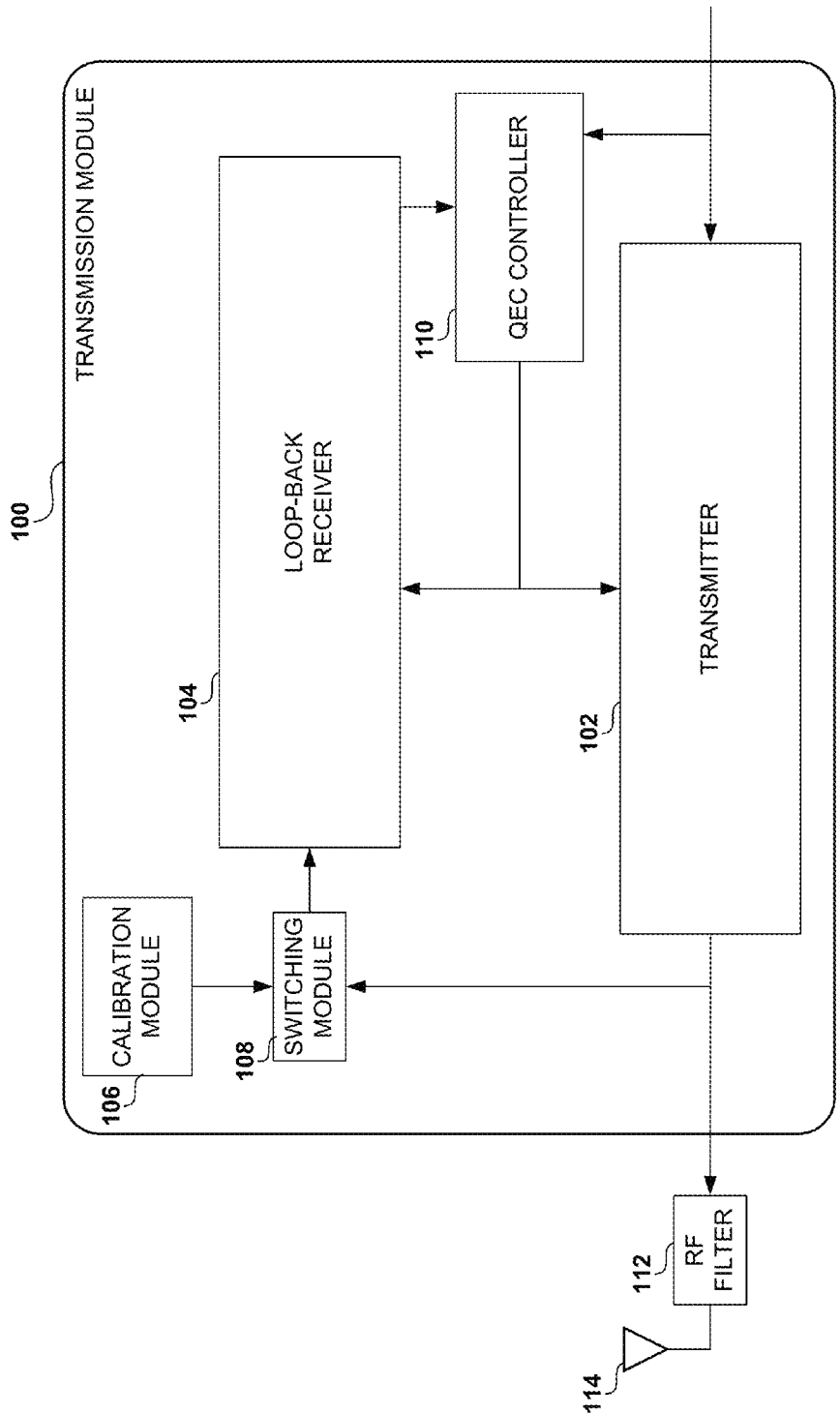
FIG. 1 is a block diagram of an embodiment of a transmission module.

The following detailed description of certain embodiments presents various descriptions of specific embodiments of the disclosure. However, the other embodiments of the disclosure can be implemented in a multitude of different ways as defined and covered by the claims. In this description, reference is made to the drawings where like reference numerals indicate similar elements.

As described herein, a transmission module is provided that includes a transmitter, a loopback receiver, a calibration module, a switching module, and a QEC controller. The switching module can be located between the transmitter output, calibration module output, and the loopback receiver input. During a calibration mode, the switching module provides a communication pathway between the calibration module and the loopback receiver. The loopback receiver processes data signals received from the calibration module and outputs the processed data signals to the QEC controller. Using the processed data signals received from the loopback receiver, the QEC controller calibrates the loopback receiver to remove quadrature imbalance in the loopback receiver, as described in greater detail in U.S. App. Nos. 61/786,393, 61/786,469, and Ser. No. 13/897,719.

After the quadrature errors have been reduced or removed from the loopback receiver, the transmission module can enter a QEC mode. During the QEC mode, the switching module provides a communication pathway between the output of the transmitter and the input of the loopback receiver. The loopback receiver processes data signals received from the transmitter and outputs the processed data signals to the QEC controller. The QEC controller compares the signals at the output of the loopback receiver with the signals at the input of the transmitter to identify and remove quadrature errors in the transmitter.

FIG. 1 is a block diagram of an embodiment of a transmission module 100 configured to correct wideband quadrature errors in a direct conversion wireless transmitter using a narrowband observation. In the illustrated embodiment, the transmission module 100 includes a transmitter 102, a loopback receiver 104, a QEC controller 110, a calibration module 106, and a switching module 108. FIG. 1 further includes a radio frequency (RF) filter 112 (e.g., balun) and an antenna 114 in communication with the transmission module 100. In some embodiments, the RF filter 112 and antenna 114 form part of the transmission module 100. In certain embodiments, the RF filter 112 and antenna 114 do not form part of the transmission module 100.

The various components of the transmission module 100 can be communicatively coupled together either directly or indirectly. For example, in some embodiments, a first input of the QEC controller 110 can be communicatively coupled to the input of the transmitter 102. In addition, a second input of the QEC controller 110 can be communicatively coupled to the output of the loopback receiver 104. The output of the QEC controller 110 can be communicatively coupled to inputs of the transmitter 102 and the loopback receiver 104.

The output of the transmitter 102 can be communicatively coupled to the input of the RF filter 112, and the output of the RF filter 112 can be communicatively coupled to the antenna 114. The inputs of the switching module 108 can be communicatively coupled to the output of the transmitter 102 and the output of the calibration module 106. The output of the switching module can be communicatively coupled with the input of the loopback receiver 104.

The transmitter 102 can be configured to receive and process data signals for wireless transmission. In some embodiments, the data signals include an in-phase data signal and a quadrature data signal. After processing the data signals, the transmitter 102 sends the processed data signals to the RF filter 112 and the antenna 114 for wireless transmission. During the QEC mode, the processed data signals from the transmitter 102 can also be sent to the loopback receiver 104.

The transmitter 102 can include various components, which will be described in greater detail below with reference to FIG. 3, to process the data signals. The components can include, but are not limited to, filters (e.g., digital filters, analog filters, complex filters (single tap, two tap, etc.)), interpolators, digital to analog converters (DAC), mixers, local oscillators (LO), LO delay tuners, operational amplifiers, capacitors, resistors, transistors, etc. As will be described in greater detail below, the transmitter 102 can exhibit quadrature imbalance due to the various components of the transmitter 102 that introduce quadrature errors into the data signals.

The loopback receiver 104 can be configured to receive and process data signals received from the transmitter 102 or the calibration module 106, as will be described in greater detail below with reference to the switching module 108. After processing the data signals, the loopback receiver 104 sends the processed data signals to the QEC controller 110.

In some embodiments, the loopback receiver 104 can function similar to, and include components similar to those found in, a receiver that would receive the wireless transmissions from the antenna 114. For example, the loopback receiver can include, but is not limited to, filters (e.g., digital filters, analog filters, complex filters), decimators, analog to digital converters (ADC), mixers, local oscillators (LO) operational amplifiers, capacitors, resistors, transistors, etc., which will be described in greater detail below with reference to FIG. 3. In some embodiments, when in the QEC mode and when quadrature imbalance has been removed from the loopback receiver 104 and the transmitter 102, the data signals at the output of the loopback receiver 104 match the data signals at the input of the transmitter 102.

The calibration module 106 can output a data signal that is used by the loopback receiver 104 during the calibration mode and can be implemented as a phase locked-loop (PLL), an auxiliary transmitter, and the like. In one embodiment, the data signal has a pattern that has a known characteristic. For example, the calibration module 106 can output a training signal, which, in some embodiments, can be a single sideband signal (e.g., no signal present at the image frequency) or a double sideband signal. In some embodiments, the frequency of the data signal from the calibration module 106 can be stepped across the transmit band of the transmitter 102. The QEC controller 110 can use the data signals received at the different frequencies to identify and correct the quadrature imbalance of the loopback receiver 104 across the different frequencies. For example, knowing the characteristics of the training signal, the QEC controller 110 can determine that quadrature errors calculated by the QEC controller during the calibration mode are due to the loopback receiver 104, and correct them.

The switching module 108 can be implemented using one or more buffers, switches (e.g., transistors), and/or one or more filters, and can be used to determine which data signals are received by the loopback receiver 104. The buffers can include an enable/disable input. When the buffers are disabled, their output can be high impedance. When the buffers are enabled, they can output a buffered version of the signal at their inputs.

In the illustrated embodiment, the switching module 108 can receive data signals from the transmitter 102 and the calibration module 106. Accordingly, the switching module 108 can output data from different sources depending on its state, or mode. In a first state, or in the calibration mode, the switching module 108 can generate as an output, the data signals received from the calibration module 106. In a second state, or in the QEC mode, the switching module 108 can generate as an output, the data signals received from the transmitter 102. Accordingly, when the switching module 108 is in the calibration mode, the loopback receiver 104 processes the data signals received from the calibration module 106, and when the switching module 108 is in the QEC mode, the loopback receiver 104 processes the data signals received from the transmitter 102.

The QEC controller 110 can be implemented using one or more processors, microcontrollers, application specific integrated circuits (ASICs), programmable logic devices (PLD), field-programmable gate arrays (FPGA), etc., and can be configured to receive processed data signals from the loopback receiver 104 and compare the processed signals with other data signals. Based on the comparison, the QEC controller 110 can adjust the characteristics of, or calibrate, the loopback receiver 104 and/or the transmitter 102.

The processed data signals received from the loopback receiver 104 can be compared with different signals depending on the mode of the transmission module 100. For example, during the calibration mode, the processed data signals from the loopback receiver 104 can be compared with signals received from the calibration module 106. In one embodiment, the signals from the calibration module 106 have a known characteristic. During the QEC mode, the processed data signals from the loopback receiver 104 can be compared with data signals received by the transmitter 102.

During the calibration mode, in some embodiments, the QEC controller 110 can compare the processed data signals from the loopback receiver 104 with data signals that are known, or stored, by the QEC controller 110. In some cases, the known signals represent an expected output of the loopback receiver 104. For example, the expected signals can be the signals outputted by the loopback receiver 104 when the loopback receiver has relatively little, or no, quadrature imbalance (i.e., introduces little, or no, quadrature error into the data signals received from the calibration module 106).

Based on the comparison, the QEC controller 110 can identify quadrature errors in the loopback receiver 104 and adjust one or more characteristics of the loopback receiver 104 to correct the quadrature errors. For example, the QEC controller 110 can adjust one or more filters in the in-phase or quadrature-phase paths of the loopback receiver 104, one or more LO delays in the in-phase or quadrature-phase LO paths, etc., as will be discussed in greater detail below. As previously mentioned, the data signal received by the loopback receiver 104 from the calibration module 106 can be stepped across the different frequencies of the transmit band. Accordingly, the quadrature imbalance of the loopback receiver 104 can be corrected across the transmit band.

During the QEC mode, in some embodiments, the QEC controller 110 can compare the processed data signals received from the loopback receiver 104 with the data signals that are received by the transmitter 102. In some embodiments, the data signals received by the transmitter 102 that are used by the QEC controller 110 for the comparison correspond to data signals that have already been processed by the transmitter 102 and/or been wirelessly transmitted by the antenna 114. Accordingly, these data signals can be buffered by the QEC controller 110 until they are compared with the output of the loopback receiver 104.

In certain embodiments, the QEC mode is entered after the QEC controller 110 has calibrated the loopback receiver 104. Accordingly, the QEC controller 110 can determine that differences between the data signals received from the loopback receiver 104 and the data signals received from the input of the transmitter are due to quadrature imbalance within the transmitter 102. Based on the determined quadrature imbalance in the transmitter 102, the QEC controller 110 can adjust one or more characteristics of the transmitter 102 to correct the quadrature imbalance. For example, the QEC controller 110 can adjust one or more filters (e.g., digital and/or analog filters) in the in-phase and/or quadrature-phase paths of the transmitter 102, one or more LO delays in the in-phase or quadrature-phase LO paths, etc.

Figure 2:
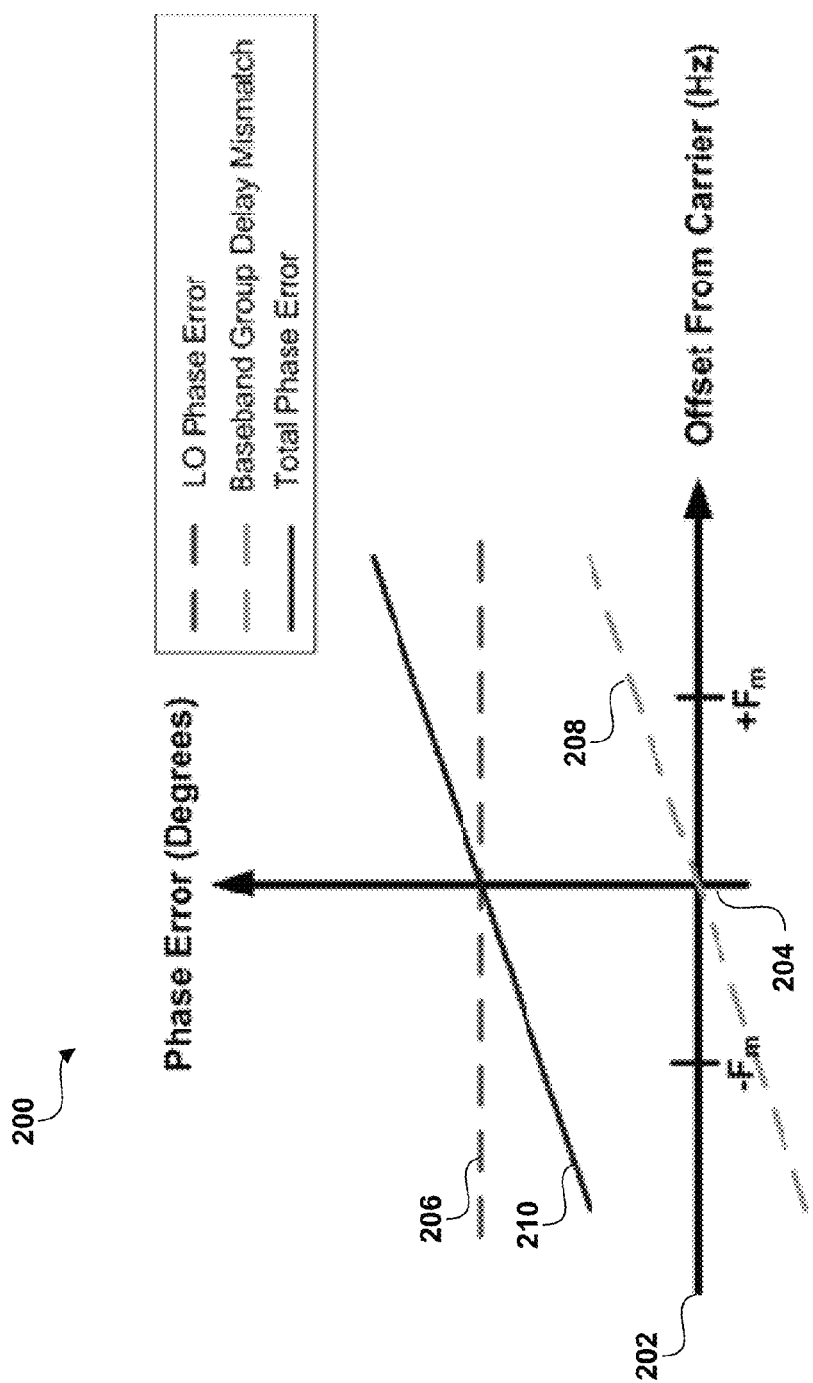
FIG. 2 is a plot of different types of phase errors that can be present in the transmitter and/or loopback receiver.

FIG. 2 is a plot 200 of different types of phase errors that can be present in the transmitter 102 and/or loopback receiver 104. The x-axis 202 of the plot represents a signal frequency, with the axis being centered at the carrier, or LO, frequency. The y-axis 204 of the plot 200 represents the amount of phase error. In some embodiments, the phase error can be caused by an LO phase error, a baseband group delay mismatch, and/or DAC clock skew. As is illustrated in FIG. 2, the phase error due to LO phase error 206 is typically relatively constant across the frequency spectrum, while phase error due to baseband group delay mismatch and/or DAC clock skew 208 can vary across the frequency spectrum. In the illustrated embodiment, the slope of the phase error due to baseband group delay mismatch and/or DAC clock skew is relatively constant. However, it will be understood, that in some instances the slope of the phase error due to baseband group delay mismatch and/or DAC clock skew can vary (e.g., can be second order). The total phase error 210 represents the summation of the phase error due to LO phase error 206, the phase error due to baseband group delay mismatch and/or DAC clock skew 208.

Figure 3:
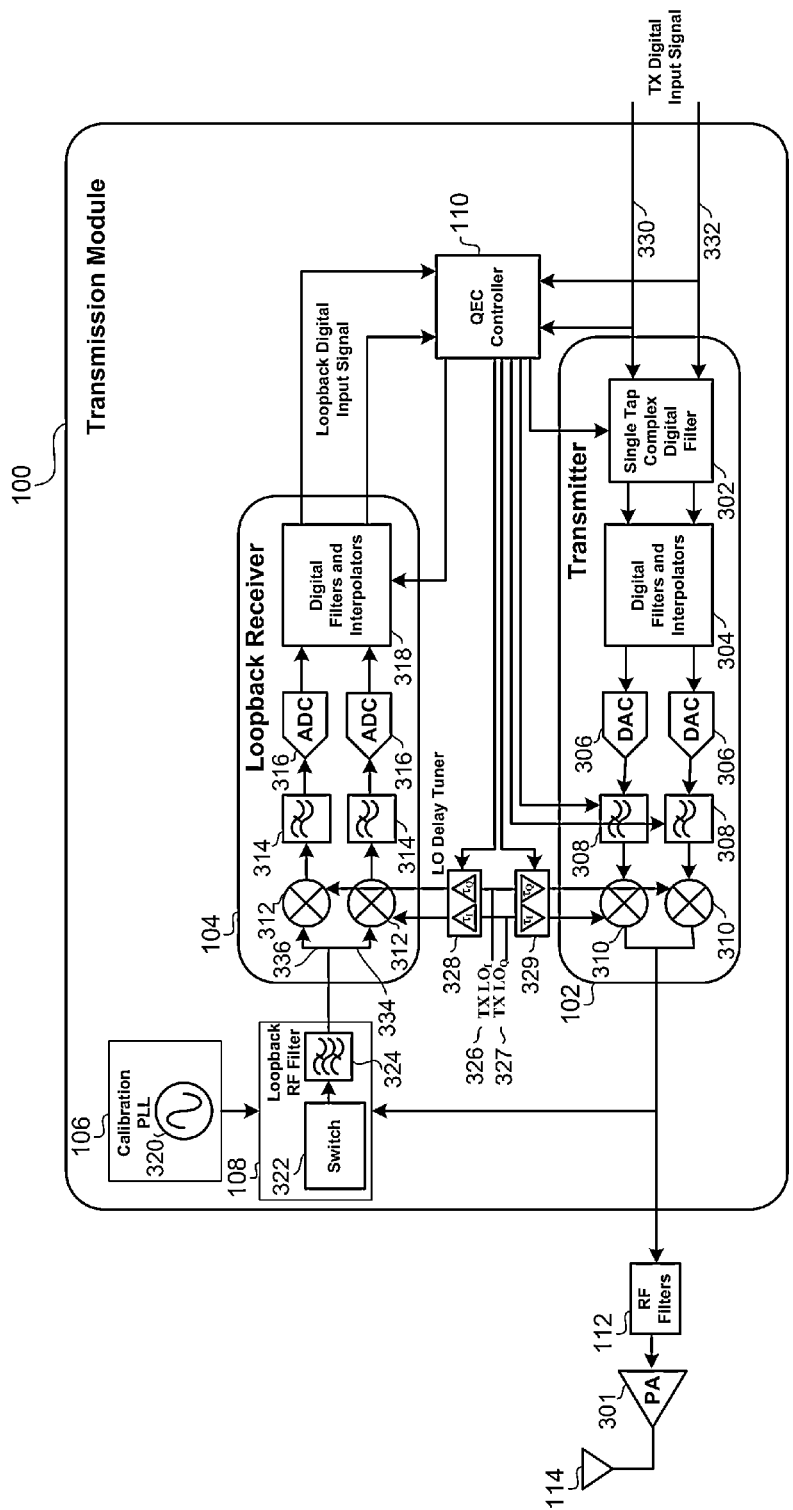
FIG. 3 is a block diagram of an embodiment of the transmission module showing one or more components of the transmitter, loopback receiver, calibration module, and switching module.

FIG. 3 is a block diagram of an embodiment of the transmission module 100 showing one or more components of the transmitter 102, loopback receiver 104, calibration module 106, and switching module 108. In addition, FIG. 3 illustrates various outputs of the QEC controller 110 that can be used to adjust the characteristics of the loopback receiver 104 and the transmitter 102. Furthermore, FIG. 3 illustrates a power amplifier 301 that can be used in conjunction with the RF filter 112 and antenna 114 for transmitting the data signals wirelessly.

The calibration module 106 can output a predetermined signal, or training signal, that can be used to calibrate the loopback receiver 104. In some embodiments, the predetermined signal can be a single sideband or double sideband signal. In the illustrated embodiment, the calibration module 106 includes a calibration phase locked-loop (PLL) 320 that generates the predetermined signal. The calibration PLL 320 can vary the frequency of the predetermined signal across the transmit band to allow the QEC controller 110 to correct the quadrature imbalance of the loopback receiver 104 across the transmit band.

In some embodiments, the calibration module 106 can include an auxiliary transmitter to generate the training signal. In some embodiments the auxiliary transmitter can be implemented as a single sideband transmitter. Prior to outputting the training signal, the auxiliary transmitter can be calibrated to remove quadrature error. In certain embodiments, the auxiliary transmitter is calibrated using a numerical control oscillator (NCO). For example, the NCO can output a sine-wave at a frequency (Ftest). The output of the auxiliary transmitter output can then be squared. Using a single-tap complex filter in the auxiliary transmitter single path, the quadrature error of the auxiliary transmitter can be calibrated by nulling the signal measured out of the squarer at 2*Ftest. In certain embodiments the auxiliary transmitter can be implemented using a double side band transmitter.

In the illustrated embodiment, the switching module 108 includes switches 322 and a loopback filter 324. However, it will be understood that other embodiments of the switching module 108 can be used. For example, in some embodiments, the switching module 108 can include the switches 322 but not include the loopback filter 324, or vice versa. The switches 322 can be implemented using one or more buffers and/or transistors.

In some embodiments, the loopback filter 324 can be used in conjunction with the complex digital filter 302 to correct baseband frequency independent quadrature imbalance in the transmitter 102. For example, the loopback filter 324 can be used to filter undesired harmonics in the output signal of the transmitter 102 that would otherwise be detected by the loopback receiver 104, and which can corrupt the measurement of quadrature error around the LO frequency of the output signal of the transmitter 102. In certain embodiments, the transmitter 102 includes mixer 310 for up-conversion, and the output signal of the transmitter 102 includes signals around the LO frequency, as well as at higher order harmonics of the LO frequency. The signals at higher LO harmonics of the output signal of the transmitter 102 are downconverted by the mixers 312 of the loopback receiver 104 and can corrupt the measurement of the quadrature error around the LO frequency in the output signal of the transmitter 102. The loopback filter 324 can be used to filter the higher order harmonics in the output signal of the transmitter 102 that would otherwise be detected by the loopback receiver 104. In this way, the transmission module 100 can avoid corruption of the fundamental output signal due to the higher order harmonics. In certain embodiments, a filter located off chip can be used to filter the undesired harmonics. Once the loopback filter 324 removes the higher order harmonics, the complex digital filter 302 can be adjusted to correct the phase error.

In some embodiments, as will be described in greater detail below, the LO delay tuners 328, 329 can be used to reduce the corruption of the measurement of the quadrature error around the LO frequency in the output signal of the transmitter 102. By correcting the LO phase delay of the transmitter 102 and receiver 104, the LO phase error of the transmitter 102 and receiver 104 can be corrected at all harmonics of the LO frequency. In this way, the transmission module 100 can avoid corruption of the fundamental output signal due to the higher order harmonics.

In the illustrated embodiment, the loopback receiver 104 includes mixers 312, baseband filters 314, ADCs 316, digital filter, complex digital filter 318, and a local oscillator delay tuner 328. Furthermore, FIG. 3 illustrates an in-phase path 334 and a quadrature-phase path 336 in the loopback receiver 104.

To process the data signals, the loopback receiver 104 splits the received data signals into the in-phase signals and quadrature signals. The in-phase data signals follow the in-phase path 334, while quadrature data signals follow the quadrature-phase path 336. Once split, the loopback receiver 104 separately demodulates the in-phase signals and the quadrature signals with their respective local oscillators 326, 327 using mixers 312. In addition, the loopback receiver 104 converts the analog data signals to digital data signals using the ADCs 316 and filters the digital data signals before sending them to the QEC controller 110.

As mentioned previously, the various components of the loopback receiver 104 can introduce quadrature error into the data signals. To remove, or compensate for, the quadrature imbalance in the components of the loopback receiver 104, the transmission module 100 can use a calibration mode. During the calibration mode, the loopback receiver 104 processes the data signals received from the calibration module 106. The QEC controller 110 compares the output of the loopback receiver 104 with an expected output to identify the quadrature imbalance and the component(s) causing the quadrature imbalance. After the sources of imbalance have been identified, the QEC controller 110 adjusts the LO delay tuner 328 and/or the digital filters and decimators 318 to correct the quadrature imbalance.

The transmitter 102, in the illustrated embodiment, includes a complex digital filter 302, digital filters and interpolators 304, DACs 306, baseband filters 308, and mixers 310. Furthermore, FIG. 3 illustrates an in-phase path 330 and a quadrature-phase path 332 in the transmitter 102. It will be understood that although the in-phase path 330 and a quadrature-phase path 332 are illustrated as a single line, the paths can include multiple lines for differential signaling. For example, the paths following the DACs 306 can be differential analog signals. The in-phase data signals follow the in-phase path 330, while quadrature-phase data signals follow the quadrature-phase path 332. To process the data signals, the transmitter 102 filters the digital in-phase and quadrature-phase signals using the complex digital filter 302 and digital filters and interpolators 304. In addition, the transmitter converts the digital data signals to analog data signals using the DACs 306. After the in-phase and quadrature-phase data signals are converted to analog data signals and filtered using baseband filters 308, they are modulated with their respective local oscillator phase 326, 327 using mixers 310, and then combined for transmission. In some embodiments, the mixers 310 in the transmitter 102 and/or the mixers 312 in the loopback receiver 104 can be implemented as harmonic-rejection mixers which can reject the undesired harmonic signals described above. In such embodiments, the transmission module 100 can be implemented without the loopback filter 324.

As mentioned previously, the in-phase path LO and the quadrature-phase path LO signals are configured to be 90 degrees out of phase, which allows the in-phase data signals and the quadrature data signals to be combined without interfering with one another. However, quadrature imbalance in the local oscillators 326, 327, filters 302, 304, 308, and/or DACs can introduce quadrature errors in the form of amplitude error (e.g., mismatching amplitudes between the in-phase path and the quadrature-path), and phase error between the in-phase path and quadrature-phase path (e.g., variance from pre-determined phase differences between the in-phase path and the quadrature-path).

Once the loopback receiver 104 is calibrated (during the calibration mode), the transmission module 100 can use the QEC mode to identify and correct quadrature imbalances in the components of the transmitter 102. Depending on the type of quadrature imbalance identified, the QEC controller 110 can correct the quadrature imbalance by adjusting the characteristics of various components of the transmitter 102. For example, in some embodiments, if the QEC controller 110 determines that the quadrature error is frequency independent with respect to the carrier frequency or LO frequency, the QEC controller 110 can adjust the characteristics of the local oscillators 326, 327 using the local oscillator delay tuner 329, as will be described in greater detail below with reference to FIG. 4. In certain embodiments, if the QEC controller 110 determines that the quadrature error is frequency independent with respect to the carrier frequency or LO frequency, the QEC controller 110 can adjust the characteristics of the complex digital filter 302. For example, the complex digital filter 302 can combine portions of the in-phase path signal with portions of the quadrature-phase path signal to correct the phase error. In some embodiments, if the QEC controller 110 determines that the quadrature error is frequency dependent with respect to the carrier frequency or LO frequency, the QEC controller 110 can adjust the characteristics of the baseband filters 308 and/or the complex digital filter 302, as will be described in greater detail below with reference to FIGS. 5A and 5B.

Figure 4:
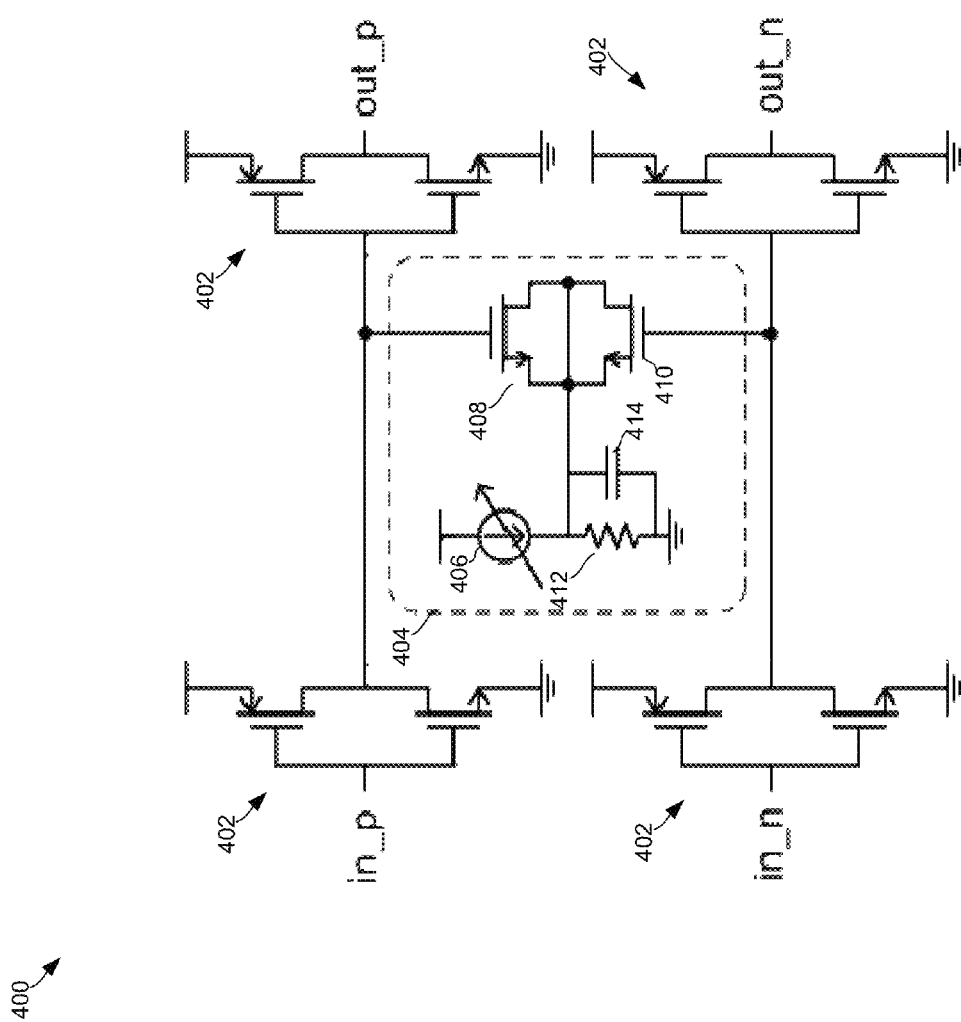
FIG. 4 is a block diagram illustrative of an embodiment of a local oscillator delay tuner for the in-phase path of the transmitter and/or the loopback receiver.

FIG. 4 is a block diagram illustrative of an embodiment of a differential signal local oscillator delay tuner 400, or local oscillator circuit, for the in-phase or quadrature-phase LO path of the transmitter 102 and/or the loopback receiver 104. The local oscillator delay tuner 400 can be used to vary the delay of the local oscillators 326, 327 with respect to one another. For example, when the QEC controller 110 determines that the quadrature error is due to local oscillator phase error, the QEC controller 110 can adjust the delay of the local oscillators with respect to one another using the local oscillator delay tuner 400. In some embodiments, the QEC controller adjusts the delay of the local oscillators by adjusting the capacitance of one or more variable capacitors. However, it will be understood that other configurations can be used to vary the local oscillator delay, such as by using variable resistors, current starved inverters with a variable bias current and/or using a resistor-capacitor (RC) low-pass filter with a variable capacitor or variable resistor. Furthermore, although illustrated as being implemented using differential signaling, it will be understood that the local oscillator delay tuner 400 can be implemented for single-ended signaling as well.

In the illustrated embodiment, the local oscillator delay tuner 400 includes inverters 402 and a variable capacitor 404. The inverters 402 can be implemented using transistors or other electronic components. For example, in the illustrated embodiment, NMOS and PMOS transistors are used to implement the transistors. However, it will be understood that the inverters can be implemented using a variety of configurations and electronic components. In addition, while the terms "metal" and "oxide" are present in the name of a MOS device, it will be understood that these transistors can have gates made out of materials other than metals, such as polycrystalline silicon, and can have dielectric "oxide" regions made from dielectrics other than silicon di-oxide, such as from silicon nitride or high-k dielectrics.

The variable capacitor 404 can be implemented using a variety of configurations. For example, the variable capacitor 404 can be implemented using voltage controlled varactors, variable current sources, variable voltage sources, digitally controlled capacitance DACs, including parallel capacitors that can be switched into and out of the circuit, etc. In the illustrated embodiment, the variable capacitor 404 is implemented using a variable current source 406, transistors 408, 410, a resistor 412, and a capacitor 414.

The output of the variable current source 406 can be coupled with the source and drain of the transistors, one end of the resistor 412, and one end of the capacitor 414. In this manner, varying the current of the variable current source 406 can vary the capacitance of the variable capacitor 404. As mentioned previously, varying the capacitance of the variable capacitor 404 can change the amount of delay of the local oscillator delay tuners 328, 329 and can correct baseband frequency independent phase error. In some embodiments, increasing the capacitance of the variable capacitor 404 increases the delay of the local oscillator delay tuners 328 and 329. In certain embodiments, decreasing the capacitance of the variable capacitor 404 decreases the delay of the local oscillator delay tuners 328 and 329.

In some embodiments, to correct the phase error, the QEC controller 110 adjusts the variable capacitor 404 of the LO delay tuner in the in-phase LO path without adjusting the variable capacitor 404 of the LO delay tuner in the quadrature-phase path, or vice versa. In certain embodiments, the QEC controller 110 adjusts the variable capacitor 404 in the in-phase LO path and the quadrature-phase LO path to correct the phase error. For example, if the QEC controller 110 determines that the quadrature-phase path is delayed, it can increase the capacitance of the variable capacitor 404 in the in-phase LO path and/or decrease the capacitance of a corresponding variable capacitor 404 in the quadrature-phase path. In embodiments, where the QEC controller 110 adjusts the variable capacitors 404 in the in-phase LO path and the quadrature-phase LO path, it can adjust the variable capacitors 404 in the different paths differently. For example, if the QEC controller 110 increases the capacitance of the variable capacitor 404 in the in-phase LO path then it can decrease the capacitance of a corresponding variable capacitor 404 in the quadrature-phase path, and vice versa.

Figure 5A:
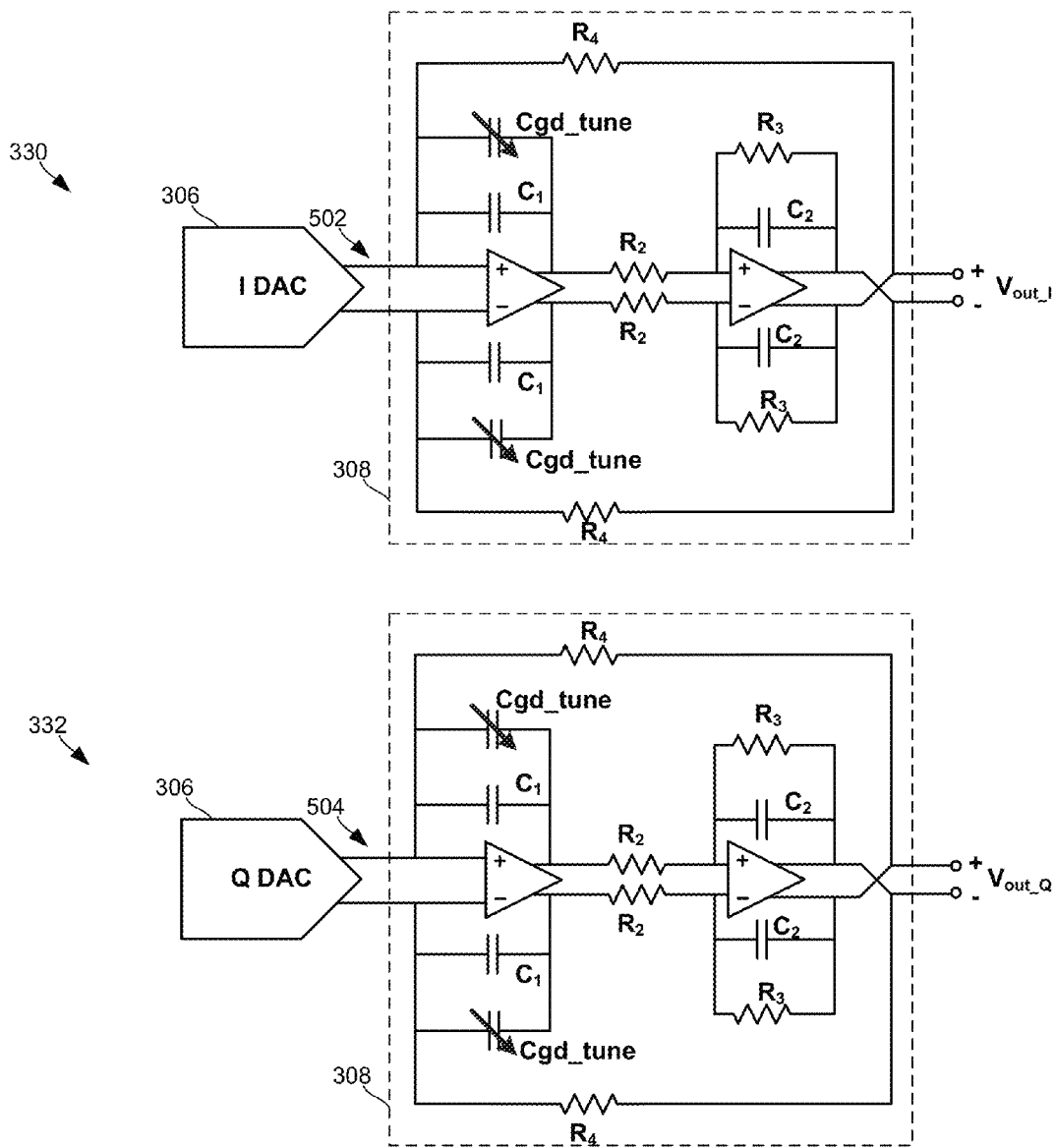
FIGS. 5A and 5B are block diagrams illustrative of embodiments of a portion of the transmitter that includes the DACs and the baseband filters with tuning circuits for correcting quadrature imbalance due to the filters.
Figure 5B:
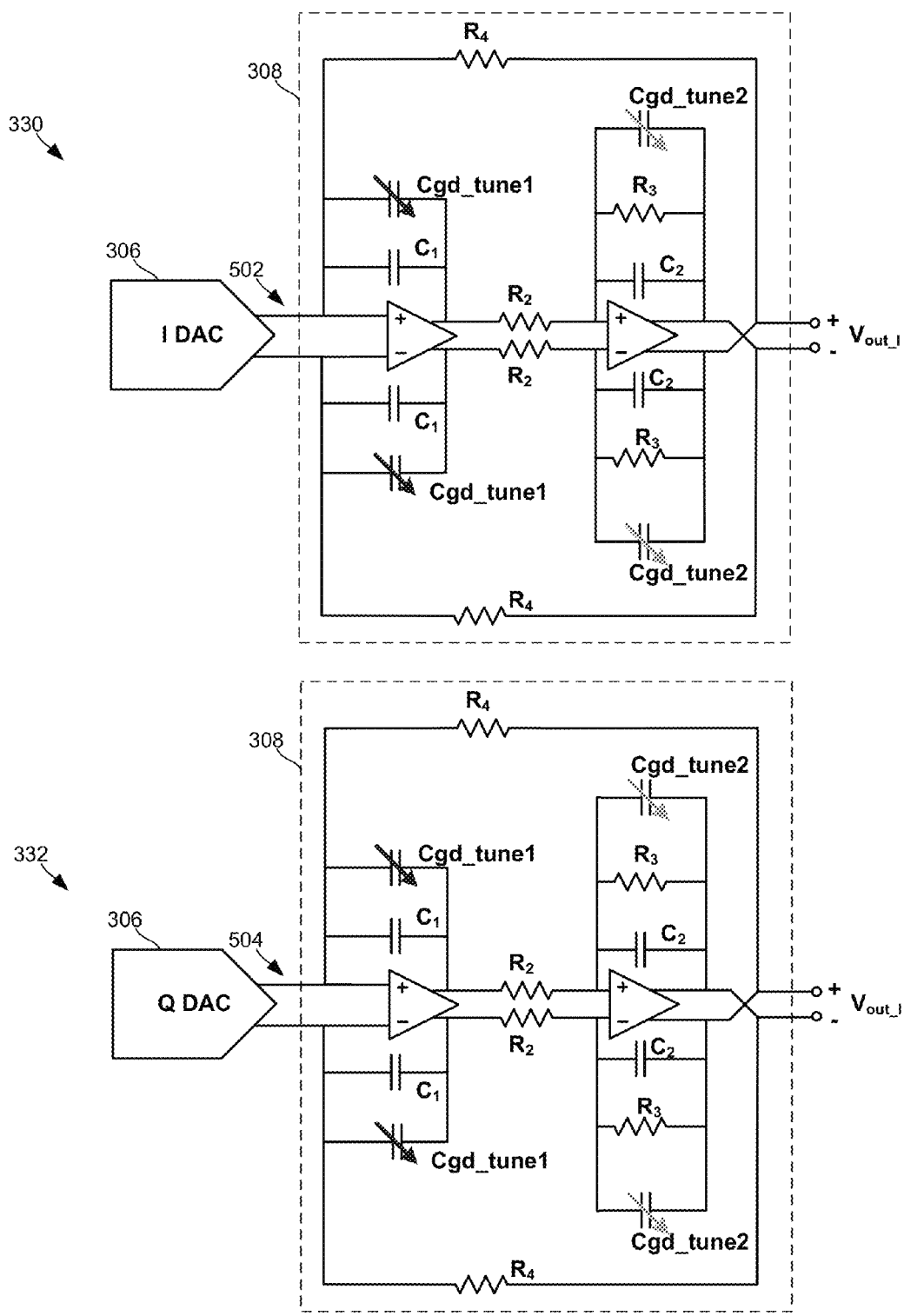

FIGS. 5A and 5B are block diagrams illustrative of embodiments of a portion of the transmitter 102 that includes the DACs 306 and the baseband filters 308 with tuning circuits for correcting quadrature imbalance due to the baseband filters 308. In the illustrated embodiments, portions of the in-phase path 330 and quadrature-phase path 332 are shown. In addition, differential analog paths 502, 504 for the in-phase and quadrature-phase paths 330, 332 are also shown.

In the illustrated embodiments, each baseband filter 308 includes one or more operational amplifiers, resistors (R2, R3, R4), and capacitors (C1, C2) configured to filter the analog signals received from the DACs 306. In some embodiments, the tuning circuit can be used to correct baseband frequency dependent phase error. The tuning circuit can be implemented using a variety of configurations. For example, the tuning circuit can be implemented using voltage controlled varactors, digitally controlled capacitance DACs, including multiple parallel capacitors that can be switched into and out of the circuit, variable capacitors, and/or variable resistors, etc. In some embodiments, components of the tuning circuit can be located in parallel with the capacitors C1 and/or C2.

In the illustrated embodiment of FIG. 5A, the tuning circuit is implemented using two variable capacitors (Cgd_tune) in parallel with capacitors C1 in the in-phase path 330 and two variable capacitors Cgd_tune in parallel with capacitors C1 in the quadrature-phase path 332. However, it will be understood that in some embodiments, the tuning circuit may only include one or more variable capacitors Cgd_tune in the in-phase path 330 and none in the quadrature-phase path 332 (or vice versa), or one or more variable capacitors Cgd_tune in both the in-phase path 330 and the quadrature-phase path 332.

In the illustrated embodiment of FIG. 5B, the tuning circuit is implemented using variable capacitors Cgd_tune1, which correspond to the variable capacitors Cgd_tune described above with reference to FIG. 5A, and variable capacitors Cgd_tune2. In the illustrated embodiment of FIG. 5B, the tuning circuit includes two variable capacitors Cgd_tune2 in parallel with capacitors C2 in the in-phase path 330 and two variable capacitors Cgd_tune2 in parallel with capacitors C2 in the quadrature-phase path 332. However, as described above with reference to the variable capacitors Cgd_tune in FIG. 5A, in some embodiments, the tuning circuit may only include one or more variable capacitors Cgd_tune2 in the in-phase path 330 and none in the quadrature-phase path 332 (or vice versa), or one or more variable capacitors Cgd_tune2 in both the in-phase path 330 and the quadrature-phase path 332. Furthermore, in some embodiments, the tuning circuit can be implemented using the variable capacitors Cgd_tune2 without the variable capacitors Cgd_tune1.

The variable capacitors (Cgd_tune, Cgd_tune1, and/or Cgd_tune2) in the tuning circuit can be used to correct phase error. For example, in some embodiments, the variable capacitors Cgd_tune and Cgd_tune1 can be used to correct first order baseband frequency dependent phase error. In certain embodiments, the variable capacitors Cgd_tune2 can be used to correct second order baseband frequency dependent phase error.

By varying the capacitance of the variable capacitors, the QEC controller 110 can adjust the baseband filter's group delay. In some embodiments, increasing the capacitance of the variable capacitors (Cgd_tune, Cgd_tune1 and/or Cgd_tune2) increases the delay of the baseband filters 308. In certain embodiments, decreasing the capacitance of the variable capacitors (Cgd_tune, Cgd_tune1 and/or Cgd_tune2) decreases the delay of the baseband filters 308. Accordingly, as the QEC controller 110 detects baseband frequency dependent phase error, it can adjust the capacitance of the variable capacitors (Cgd_tune, Cgd_tune1 and/or Cgd_tune2) to correct the phase error.

In some embodiments, the QEC controller 110 adjusts the variable capacitors (Cgd_tune, Cgd_tune1 and/or Cgd_tune2) in the in-phase path 330 without adjusting the variable capacitors (Cgd_tune, Cgd_tune1 and/or Cgd_tune2) in the quadrature-phase path 332, or vice versa. In certain embodiments, the QEC controller 110 adjusts the variable capacitors (Cgd_tune, Cgd_tune1 and/or Cgd_tune2) in the in-phase path 330 and the quadrature-phase path 332 to correct the phase error. For example, if the QEC controller 110 determines that the quadrature-phase path is delayed, it can increase the capacitance of the variable capacitors (Cgd_tune, Cgd_tune1 and/or Cgd_tune2) in the in-phase path 330 and/or decrease the capacitors (Cgd_tune, Cgd_tune1 and/or Cgd_tune2) in the quadrature-phase path 332. In embodiments, where the QEC controller 110 adjusts the variable capacitors (Cgd_tune, Cgd_tune1 and/or Cgd_tune2) in the in-phase path 330 and the quadrature-phase path 332, it can adjust the variable capacitors (Cgd_tune, Cgd_tune1 and/or Cgd_tune2) in the different paths differently. For example, if the QEC controller 110 increases the capacitance of a variable capacitor (Cgd_tune, Cgd_tune1 and/or Cgd_tune2) in the in-phase path 330 then it can decrease the capacitance of a corresponding variable capacitor (Cgd_tune, Cgd_tune1 and/or Cgd_tune2) in the quadrature-phase path 332, and vice versa.

Figure 6:
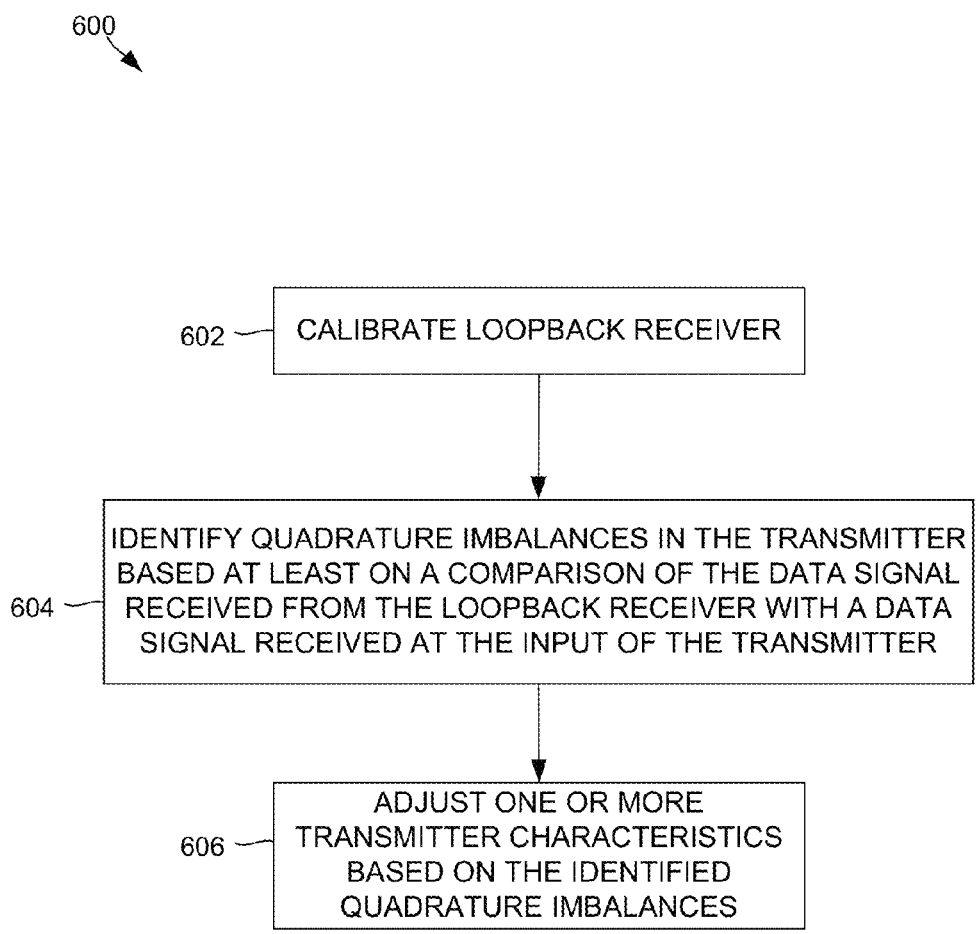
FIG. 6 is a flow diagram illustrative of a routine for correcting quadrature error in the transmitter.

FIG. 6 is a flow diagram illustrative of a routine 600 for correcting quadrature error in the transmitter 102. While specific steps of the example routine 600 provided below are described as being performed by a particular component of the transmission module 100, the steps of the routine 600 can generally be implemented by other components in other embodiments, such as any one, or any combination, of the QEC controller 110, the transmitter 102, and/or the loopback receiver 104, and can be implemented by hardware, by software/firmware, or by a combination of hardware and software/firmware. In one embodiment, instructions for the routine 600 are stored in a tangible non-transitory computer-readable medium and are executed by a processor.

At block 602, the QEC controller 110 calibrates the loopback receiver 104. As discussed in greater detail above, to calibrate the loopback receiver 104, the loopback receiver 104 can receive and process data signals from the calibration module 106. The QEC controller 110 can compare the processed data signals output by the loopback receiver 104 with an expected output. Based on the comparison, the QEC controller 110 can adjust one or more characteristics of the loopback receiver 104. For example, the QEC controller 110 can adjust the as local oscillator delay and/or filter delay. The QEC controller 110 can continue to adjust the characteristics of the loopback receiver 104 until the output of the loopback receiver 104 matches the expected output and/or the output of the loopback receiver 104 is within a threshold variance of the expected output. In other words, the QEC controller 110 can continue adjusting the characteristics of the loopback receiver until the quadrature imbalance of the loopback receiver is corrected.

At block 604, the QEC controller 110 identifies quadrature imbalances in the transmitter based at least on a comparison of a data signal received from the loopback receiver with a data signal received at the input of the transmitter. Following the calibration of the loopback receiver 104, a switching module 108 can direct data signals received from the output of the transmitter 102 to the loopback receiver 104. The loopback receiver 104 can process the data signals and send them to the QEC controller 110. The QEC controller 110 can compare the received data signals from the loopback receiver 104 to data signals received at the input of the transmitter 102. In some embodiments, the data signals received at the input of the transmitter 102 are buffered such that the signals received from the loopback receiver 104 correspond to the data signals received at the input of the transmitter 102. If the signals match, the QEC controller 110 can determine that there is little or no quadrature imbalance in the transmitter 102. However, in many instances, the signals will not match due to the quadrature imbalance in the transmitter 102.

At block 606, the QEC controller 110 adjusts characteristics of the transmitter 102 based on the comparison. As mentioned previously, the components of the transmitter 102 can introduce quadrature errors into the data signals, which can differ depending on the source of the quadrature imbalance. For example, if the source of the imbalance is the baseband filters 308, the quadrature error can be baseband frequency dependent phase error. If the source of the imbalance is the local oscillators, the quadrature error can be baseband frequency independent phase error. Accordingly, the QEC controller 110 can identify the type of quadrature error (e.g., baseband frequency dependent phase error or baseband frequency independent phase error) and adjust the characteristics of the transmitter 102 depending on the error. In some embodiments, to correct the baseband frequency dependent phase errors, the QEC controller 110 adjusts the baseband group delay in the baseband filter 308. In certain embodiments, to correct the baseband frequency independent phase errors, the QEC controller adjusts the local oscillator delay.

Fewer, more, or different blocks, or any combination thereof, can be used to implement the routine 600. For example, in some embodiments, the routine 600 can include individual blocks for the various portions of the loopback receiver calibration process.

System Model

In various embodiments, in order to identify and/or correct imbalances between in-phase and quadrature-phase signals in the transmitter, the combination of a TX channel (for example, the data signals 330 and 332 received at the input of the transmitter 102) and observation channel (for example, the loopback signals received at the QEC controller 110 from the loopback receiver 104) can be modeled as a multiple-input multiple-output (MIMO) system, where each "branch" is a channel with, for example, N real coefficients.

Figure 7:
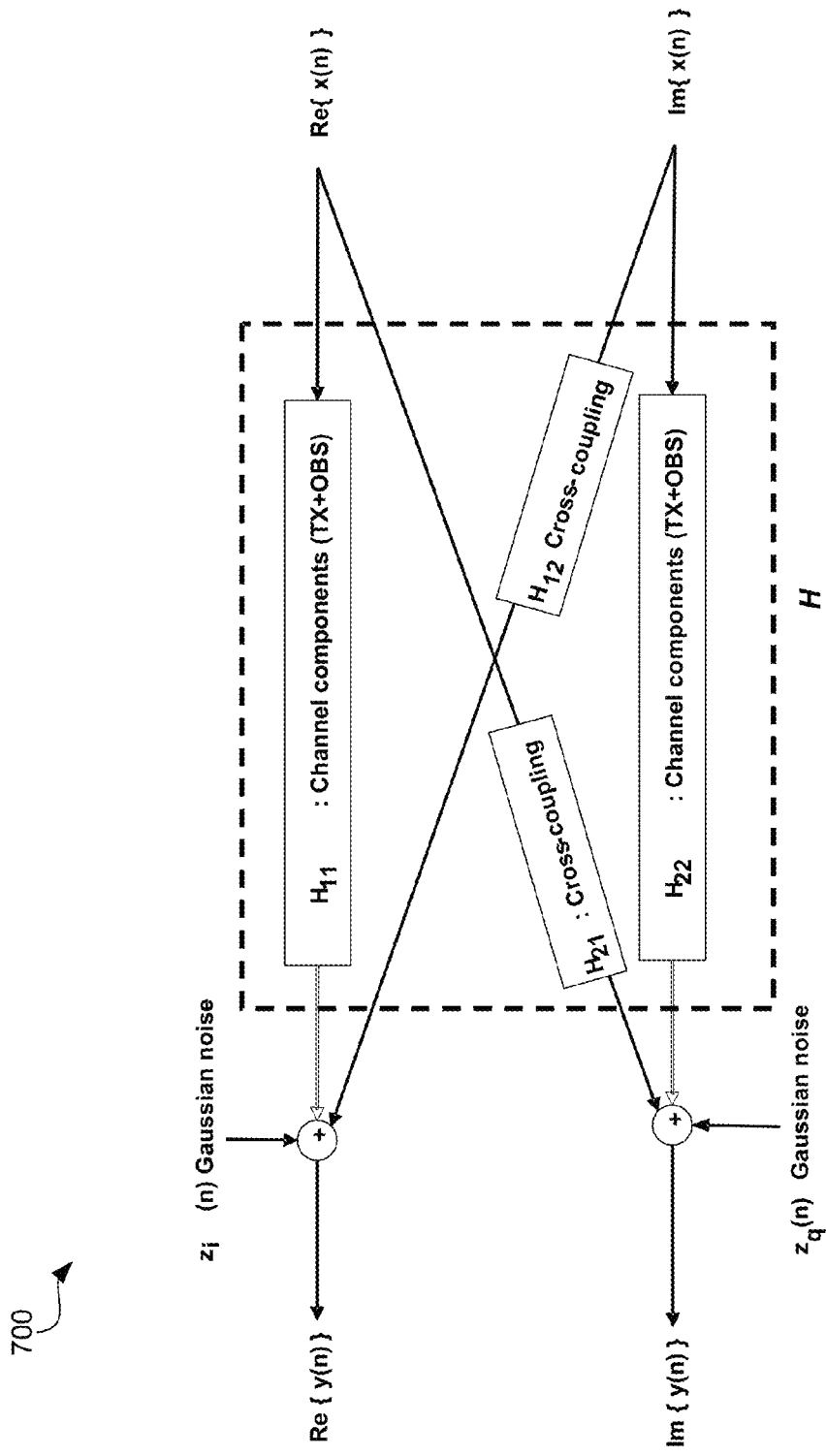
FIG. 7 is an exemplary model of a portion of the transmission module of FIG. 1.

FIG. 7 is an exemplary model 700 of a portion of the transmission module 100 of FIG. 1. As shown in FIG. 7, the model 700 includes a convolution matrix H including branches $H_{11}$, $H_{12}$, $H_{21}$, and $H_{22}$ The model 700 receives an I-phase TX input $\text{Re}\{x(n)\}$ and a Q-phase TX input $\text{Im}\{x(n)\}$ and outputs an I-phase observed output $\text{Re}\{y(n)\}$ and a Q-phase observed output $\text{Im}\{y(n)\}$. In various embodiments, the I-phase TX input $\text{Re}\{x(n)\}$ and Q-phase TX input $\text{Im}\{x(n)\}$ can include, for example, the data signals 330 and 332 received at the input of the transmitter 102. The I-phase observed output $\text{Re}\{y(n)\}$ and the Q-phase observed output $\text{Im}\{y(n)\}$ can include, for example, the loopback signals received at the QEC controller 110 from the loopback receiver 104. Although various portions are described herein with respect to the model 700 of FIG. 7, a person having ordinary skill in the art will appreciate that various portions can be added, omitted, and/or rearranged.

In the illustrated embodiment, branch $H_{11}$ is an N×N convolutional matrix that denotes the effective frequency-selective channel from $\text{Re}\{x(n)\}$ to $\text{Re}\{y(n)\}$. The matrices $H_{12}$ and $H_{21}$ model the crosstalk between the I- and Q-phase. In various embodiments, crosstalk can occur for various reasons. For example, embodiments where the observation path is frequency locked to the TX path can cause cross-talk between the I- and Q-phases. In certain embodiments described herein, however, mixers in the observation path are not phase-locked to the TX path. Accordingly, received samples can have a phase rotation, which can be equivalent to cross-talk between the I- and Q-phases. As another example, mixer-phase mismatch can also cause cross-talk between the I- and Q-phases. In the illustrated embodiment, the branches $H_{12}$ and $H_{21}$ are also modeled as N×N convolutional matrices.

In various embodiments, the 2N×2N channel matrix H of FIG. 7 can be expressed in convolutional form as shown in Equation 2, below:

$$H = \begin{vmatrix} H_{11} & H_{12} \\ H_{21} & H_{22} \end{vmatrix} \qquad (2)$$

The illustrated model 700 further includes samples $z_i(n)$ and $z_q(n)$ from mutually independent and identically distributed (IID) white Gaussian processes with zero-mean and variance $\sigma^2$. The samples $z_i(n)$ and $z_q(n)$ represent the effective thermal noise as seen from the observation path. In various embodiments, the noise processes are also independent of x(n). Thus, the system model can be written as shown in Equation 3:

$$\begin{vmatrix} \text{Re}\{y(n)\} \\ \text{Im}\{y(n)\} \end{vmatrix} = \begin{vmatrix} H_{11} & H_{12} \\ H_{21} & H_{22} \end{vmatrix} \times \begin{vmatrix} \text{Re}\{x(n)\} \\ \text{Im}\{x(n)\} \end{vmatrix} + \begin{vmatrix} z_i(n) \\ z_q(n) \end{vmatrix} \qquad (3)$$

where the bold-face vectors represent time-indexed N×1 columns, for example as shown in Equation 4:

$$z(n) = |z_i(n) \ldots z_i(n-N+1)|^T \qquad (4)$$

Channel Estimation

In various embodiments described herein, the auto-covariance matrix of the input vector $\Phi_{xx}$ is defined as shown in Equation 5 and the cross-covariance matrix of the output and input vectors $\Phi_{yx}$ is defined as shown in Equation 6:

$$\Phi_{xx} = E\left\{ \begin{vmatrix} \text{Re}\{x(n)\} \\ \text{Im}\{x(n)\} \end{vmatrix} \times \begin{vmatrix} \text{Re}\{x(n)\} \\ \text{Im}\{x(n)\} \end{vmatrix}^T \right\} \qquad (5)$$

$$\Phi_{yx} = E\left\{ \begin{vmatrix} \text{Re}\{y(n)\} \\ \text{Im}\{y(n)\} \end{vmatrix} \times \begin{vmatrix} \text{Re}\{x(n)\} \\ \text{Im}\{x(n)\} \end{vmatrix}^T \right\} \qquad (6)$$

Thus, a minimum mean square error (MMSE) estimate Ĥ of H can be expressed by the Wiener-Hopf equation shown in Equation 7:

$$\hat{H}^T = \Phi_{xy} \cdot \Phi^{-1}_{xx} \qquad (7)$$

In various embodiments, $\Phi_{xx}$ is not always invertible. In other words, in various embodiments the TX spectra can be "sparse," "low-rank", "rank-deficient," "ill-conditioned," time-varying, etc. This can be especially true for base-station signals, where not all users can be active simultaneously. Moreover, even when $\Phi_{xx}$ is invertible (for example, exhibiting "full rank"), the TX spectrum can be highly shaped, since pre-distortion "skirts" in adjacent channels can be, for example, 30-40 dB below the main signal level and then tail off significantly. Thus, in certain embodiments, conventional linear estimation algorithms can be unstable. For example, least-mean-square (LMS) and recursive-least-squares (RLS) algorithms can become numerically unstable because they implicitly perform the matrix inversion shown in Equation 7.

In some embodiments, the QEC controller 110 can select a signal processing method based at least in part on a characteristic of an input signal. For example, the QEC controller 110 can determine whether the input signal is full-rank or low-rank (e.g., by comparing a sparseness metric to a threshold), perform supervised QEC when the input signal is full rank, and perform low-rank signal processing when the input signal is low-rank.

In various embodiments, the QEC controller 110 (FIG. 1) can be configured to perform low-rank signal processing, which can also be referred to as reduced-rank signal processing, or sub-space tracking. For example, in one embodiment, the QEC controller 110 can employ singular value decomposition to solve Equation 5, above. As described herein, the auto-covariance matrix of the input vector $\Phi_{xx}$ is symmetric, positive semi-definite, and real. Accordingly, the singular value decomposition of $\Phi_{xx}$ is equivalent to its eigenvalue decomposition, and can be stated as shown in Equation 8, where U is a matrix of orthogonal eigenvectors and Λ is diagonal, with the eigenvalues of $\Phi_{xx}$ lying along the main diagonal:

$$\Phi_{xx} = U \cdot \Lambda \cdot U^T \qquad (8)$$

Because $\Phi_{xx}$ is symmetric and positive-definite, a full set of unique orthogonal eigenvectors are guaranteed to exist, and all the eigenvalues will be real. In an embodiment, the QEC controller can construct a matrix $\Lambda^\dagger$ as shown in Equation 9, replacing diagonal terms that are close to singular by 0:

$$\Lambda^\dagger = \begin{vmatrix} \lambda_1^{-1} & & & & & \\ & \lambda_2^{-1} & & & 0 & \\ & & \ddots & & & \\ & & & \lambda_r^{-1} & & \\ & & & & 0 & \\ & 0 & & & & \ddots \\ & & & & & & 0 \end{vmatrix} \qquad (9)$$

The pseudo-inverse of $\Phi_{xx}$ can be expressed as shown in Equation 10, and the low-rank estimate of H can be expressed as shown in Equation 11:

$$\Phi^\dagger_{xx} = U \cdot \Lambda^\dagger \cdot U^T \qquad (10)$$

$$\hat{H}^T = U \cdot \Lambda^\dagger \cdot U^T \cdot \Phi_{xy} \qquad (11)$$

In various embodiments, since U is orthonormal, the estimation can be numerically stable, irrespective of the condition number of $\Phi_{xx}$. Although described herein with respect to singular value decomposition (SVD), the QEC controller 110 can be configured to track low-rank channels according to other methods, which in some embodiments can be simpler and/or adaptive.

Digital Equalization QEC

In various embodiments, the QEC controller 110 can construct one or more equalizers from the estimated channel coefficients in Ĥ. In some embodiments, for example, the QEC controller 110 can compute $\hat{H}^{-1}$ directly. In other embodiments, the QEC controller 110 can be configured to cancel the identified I/Q imbalance rather than equalize for the entire RF channel. In one such embodiment, the QEC controller 110 can construct a precoder matrix as shown in Equation 12:

$$P = \begin{vmatrix} \hat{H}_{22} & -\hat{H}_{12} \\ -\hat{H}_{21} & \hat{H}_{11} \end{vmatrix} \quad (12)$$

Thus, the effective channel at the output of the observation path is shown in Equation 13:

$$H \times P = \begin{vmatrix} H_{11} & H_{12} \\ H_{21} & H_{22} \end{vmatrix} \times \begin{vmatrix} \hat{H}_{22} & -\hat{H}_{12} \\ -\hat{H}_{21} & \hat{H}_{11} \end{vmatrix} \quad (13)$$

$$= \begin{vmatrix} H_{11}\hat{H}_{22} - H_{12}\hat{H}_{21} & -H_{11}\hat{H}_{12} + H_{12}\hat{H}_{11} \\ H_{21}\hat{H}_{22} - H_{22}\hat{H}_{21} & -H_{21}\hat{H}_{12} + H_{22}\hat{H}_{11} \end{vmatrix}$$

In an embodiment, all the sub-matrices of H and $\hat{H}$ are convolutional matrices and the product of any two sub-matrices is commutative. In some embodiments, the MMSE estimator $\hat{H}$ is a consistent and unbiased estimator of H in Gaussian noise (provided that Equation 7 can be computed). Thus, as the number of observations increases, $E\{\hat{H}\}$ approaches H. Hence, the average effective channel between x(n) and y(n) can be expressed as shown in Equation 14.

$$E\{H \times P\} = \begin{vmatrix} H_{11}H_{22} - H_{12}H_{21} & 0 \\ 0 & H_{11}H_{22} - H_{12}H_{21} \end{vmatrix} \quad (14)$$

In Equation 14, the main diagonal terms are identical. Thus, on average, both Re{x(n)} and Im{x(n)} pass through the same channel. In the region of interest, the signal can be lightly shaped by the compensator. Moreover, the off-diagonal matrices of Equation 14 are 0. Thus, the I/Q imbalance between Re{x(n)} and Im{x(n)} is effectively canceled.

In embodiments where the TX input signal is spectrally sparse, the low-rank estimate $\hat{H}$ is not an unbiased estimator for H. In such scenarios, I/Q imbalance is compensated only in spectral regions where the channel can be estimated. Hence, the QEC controller 110 can be configured to update and/or adaptively track $\hat{H}$ at intervals that match the coherence time of TX signal statistics.

Hybrid Digital-Analog QEC

In some embodiments, the QEC controller 110 (FIG. 1) can be configured to estimate one or more correction terms for gain mismatch, mixer phase mismatch, and/or group-delay mismatch, based on the estimate $\hat{H}$ (discussed above with respect to the section titled "Channel Estimation" and Equations 2-11). In various embodiments, the QEC controller 110 can adjust a gain at the transmitter 102 using the gain correction term. For example, the transmitter 102 can include a digital- or analog-adjustable amplifier.

The QEC controller 110 can adjust a mixer phase at one or more local oscillators 326 and 327 using the mixer phase correction term. For example, the QEC controller 110 can adjust one or more of the local oscillator delay tuner 328, 329 to correct the delay of the local oscillators 326 and/or 327, as discussed above with respect to FIGS. 3 and 4. In one embodiment, the local oscillator delay tuners 328 and 329 can be analog-adjustable. The QEC controller 110 can adjust a group-delay at the transmitter 102 using the group-delay correction term. For example, the QEC controller 110 can adjust the baseband filters 308 to correct a group-delay at the transmitter 102. In one embodiment, the baseband filters 308 can be analog adjustable.

In an embodiment, the QEC controller 110 can determine each correction term based on the estimate $\hat{H}$. Particularly, the QEC controller 110 can compute a matrix R according to Equations 15 and 16, where the matrix Q is a rotation matrix representing phase rotation due to LO phase offset:

$$\hat{H} = Q \times R \quad (15)$$

$$R = \begin{vmatrix} R_{11} & R_{12} \\ 0 & R_{22} \end{vmatrix} \quad (16)$$

In various embodiments, the QEC controller 110 can determine the gain correction term $C_G \approx R_{22}/R_{11}$. The QEC controller 110 can determine the phase correction term $C_P \approx R_{12}/R_{11}$. As used herein the "$\approx$" symbol can denote a substantial equivalence such as, for example, values that are exactly the same, values that are within a threshold difference or multiple of each other, values that are sufficiently similar to accomplish the same goal, and so on.

In various embodiments, the QEC controller 110 can determine the group-delay correction term $C_D$ based on the time-shift between $\hat{H}_{11}$ and $\hat{H}_{22}$. Particularly, the QEC controller 110 can compute or estimate a group-delay mismatch as a time-shift between $\hat{H}_{11}$ and $\hat{H}_{22}$. For example, the QEC controller 110 can compute a cross-correlation between I and Q branches and determine a true correlation peak (such as via interpolation). The time-shift of the true correlation peak can represent the true group-delay mismatch. The QEC controller 110 can select a group-delay correction term $C_D$ so as to cancel the time-shift between $\hat{H}_{11}$ and $\hat{H}_{22}$. In various embodiments, the QEC controller 110 can compute the group-delay via time-domain processing such as, for example, the SVC process described above.

In various embodiments, values, matrices, correction terms, etc. are described herein as being computed and/or determined. In some embodiments, correction terms can be estimated. For example, the QEC controller 110 can be configured to estimate a correction term according to one or more equations described herein, the resulting correction term being sufficient to at least partially correct one or more mismatches, or to correct the one or more mismatches within a threshold amount. Thus, the correction terms need not computed exactly.

Digital Parameter QEC

Figure 8A:
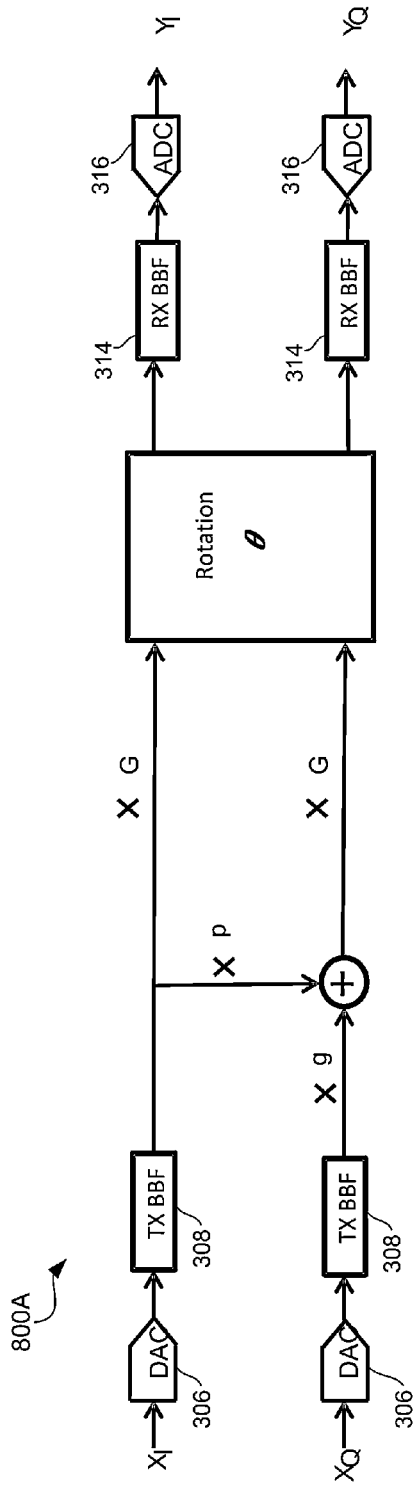
FIG. 8A is an exemplary model of a portion of the transmission module of FIG. 1.
Figure 8B:
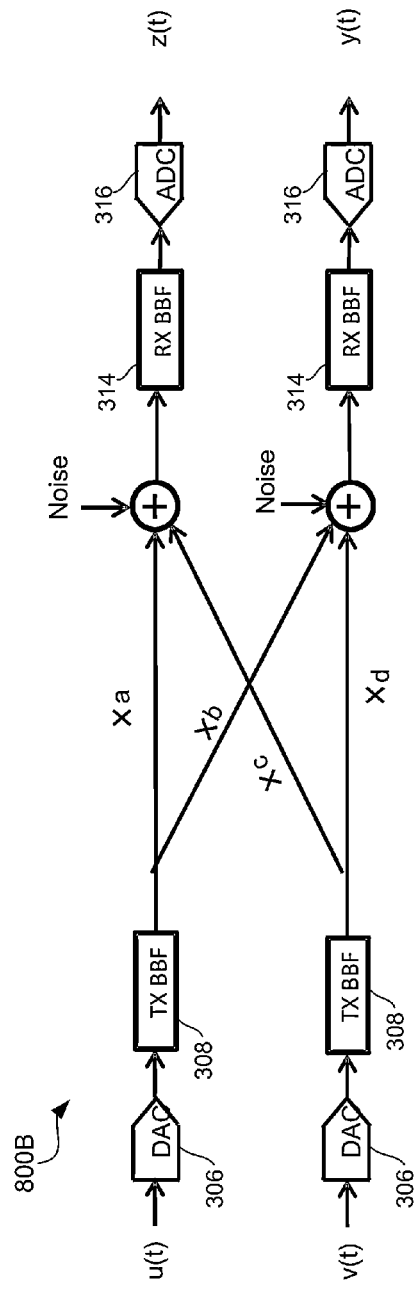
FIG. 8B is another exemplary model of a portion of the transmission module of FIG. 1.

In various embodiments, the transmission module 100 of FIG. 1 can be modeled as a parameterized linear transformation. For example, in some embodiments, TX and RX baseband filters (such as the baseband filters 308 and 314 described above with respect to FIG. 3) can have an approximately flat frequency response within a frequency band for which QEC is to be performed. In some embodiments, a transmission model can assume small or zero initial group delay error, for example due to the calibration techniques discussed herein. In some embodiments, a transmission model can assume that the channels $H_{11}$, $H_{12}$, $H_{21}$, $H_{22}$ (FIG. 7) are scalars instead of finite impulse response (FIR) filters. Accordingly, correction terms can be determined without SVD, LU or QR decomposition. Moreover, eliminating degrees of freedom in the channel estimates $H_{11}$, $H_{12}$, $H_{21}$, and $H22$ can solve issues of sparsity or "low-rank" information from the correlations. FIGS. 8A-8B show exemplary models in accordance with embodiments discussed herein.

FIG. 8A is an exemplary model 800A of a portion of the transmission module 100 of FIG. 1. As shown in FIG. 8A, the model 800A includes DACs 306 (FIG. 3), transmit baseband filters 308 (FIG. 3), receive baseband filters 314 (FIG. 3), ADCs 316 (FIG. 3), and a rotation block. The model 800A can receive in-phase and quadrature-phase TX input signals $X_I$ and $X_Q$ and can output in-phase and quadrature-phase observed output signals $Y_I$ and $Y_Q$. In various embodiments, the in-phase and quadrature-phase TX input signals $X_I$ and $X_Q$ can include, for example, the I-phase TX input Re{x(n)}, the Q-phase TX input Im{x(n)}, and/or the data signals 330 and 332 received at the input of the transmitter 102. The in-phase and quadrature-phase observed output signals $Y_I$ and $Y_Q$ can include, for example, the I-phase observed output Re{y(n)}, the Q-phase observed output Im{y(n)}, and/or the loopback signals received at the QEC controller 110 from the loopback receiver 104. Although various portions are described herein with respect to the model 800A of FIG. 8A, a person having ordinary skill in the art will appreciate that various portions can be added, omitted, and/or rearranged.

In the illustrated embodiment, the outputs of the transmit baseband filters 308 are variously combined, multiplied by gains g, p, and G, and rotated by a phase offset θ. The gain g represents gain differences in the transmit baseband filters 308. The gain p represents a gain difference cause by an inexact TX LO quadrature phase. The gains G represent a loopback gain. The phase offset θ represents signal rotation due to the phase offset between TX and RX LOs.

Particularly, the quadrature-phase TX input path is multiplied by the gain g, added to the in-phase TX input path multiplied by the gain p, the sum of which is multiplied by the loopback gain G, the output of which is rotated by the phase offset θ. The in-phase TX input path is multiplied by the loopback gain G and rotated by the phase offset θ. In various embodiments, the model 800A can be further modeled, as discussed below with respect to FIG. 8B.

FIG. 8B is another exemplary model 800B of a portion of the transmission module 100 of FIG. 1. As shown in FIG. 8B, the model 800B includes a 2×2 linear transformation of the model 800A, parameterized by variables a-d. The model 800B includes DACs 306 (FIG. 3), transmit baseband filters 308 (FIG. 3), receive baseband filters 314 (FIG. 3), ADCs 316 (FIG. 3). The model 800B can receive TX input signals u(t) and v(t) and can output signals z(t) and y(t). In various embodiments, the TX input signals u(t) and v(t) can include, for example, the in-phase and quadrature-phase TX input signals $X_I$ and $X_Q$, the I-phase TX input Re{x(n)}, the Q-phase TX input Im{x(n)}, and/or the data signals 330 and 332 received at the input of the transmitter 102. The output signals z(t) and y(t) can include, for example, the in-phase and quadrature-phase observed output signals $Y_I$ and $Y_Q$, the I-phase observed output Re{y(n)}, the Q-phase observed output Im{y(n)}, and/or the loopback signals received at the QEC controller 110 from the loopback receiver 104. Noise can include, for example, samples $z_i(n)$ and $z_q(n)$ from mutually independent and identically distributed (IID) white Gaussian processes with zero-mean and variance $\sigma^2$. Although various portions are described herein with respect to the model 800B of FIG. 8B, a person having ordinary skill in the art will appreciate that various portions can be added, omitted, and/or rearranged.

In an embodiment, the QEC controller 110 (FIG. 1) can estimate the parameters a-d based on, for example, input and output correlations of the model 800B. As shown in FIG. 8B, each autocorrelation or cross-correlation is reduced to a single scalar formed from a linear combination of the correlation's time lags. In some embodiments, the weights of the linear combination can represent an FIR filter with pass-band selecting the band of interest for QEC. The QEC controller 110 can determine a parameter matrix as shown in Equations 17 and 18, based on these resulting scalar values Cuu(0), Cuv(0), etc.:

$$\begin{bmatrix} a & b \\ c & d \end{bmatrix} = \begin{bmatrix} Cuu(0) & Cuv(0) \\ Cvu(0) & Cvv(0) \end{bmatrix}^{-1} \begin{bmatrix} Czu(0) & Cyu(0) \\ Czv(0) & Cyv(0) \end{bmatrix} \quad (17)$$

$$\begin{bmatrix} a & b \\ c & d \end{bmatrix} = \begin{bmatrix} 1 & 0 \\ p & g \end{bmatrix} \times G \times \begin{bmatrix} \cos(\theta) & -\sin(\theta) \\ \sin(\theta) & \cos(\theta) \end{bmatrix} \quad (18)$$

As shown in Equations 17 and 18, the parameters a-d can be determined as least-squares estimates for each channel. In various embodiments, this is the maximum likelihood estimate when the noise is mutually independent and identically distributed (IID) white Gaussian processes with zero-mean and variance σ2. In an embodiment, the QEC controller 110 can remove DC from all correlations.

The QEC controller 110 can determine $G=\text{sqrt}(a^2+b^2)$; $\theta = a\tan(b/a)$; $g=(ad-bc)/(a^2+b^2)$; and $p=(ac+bd)/(a^2+b^2)$. The QEC controller 110 can determine one or more gain mismatch correction terms based on the determined parameters p and g, and control gain at the transmitter 102, for example as described above with respect to FIG. 7 and the section titled "Hybrid Digital-Analog QEC." In various embodiments, one or more gain correction terms may only affect gain on one of the in-phase and quadrature-phase signal paths such as, for example, only on the quadrature-phase signal path. In an embodiment, gain adjustment by the gain correction term can be digital.

The QEC controller 110 can determine one or more mixer phase correction terms based on the determined parameters p and g, and control a mixer phase at one or more local oscillators 326 and 327 using the mixer phase correction term, for example as described above with respect to FIG. 7 and the section titled "Hybrid Digital-Analog QEC." In an embodiment, phase adjustment by the phase correction term can be analog.

In various embodiments, TX phase and gain quadrature errors can vary dramatically when analog attenuator settings change on the transmitter. To track these changes, the QEC controller 110 can cache of correction values can be maintained in a lookup table and accessed via interrupt during attenuation steps. In some embodiments, QEC tracking can runs as a background task on a multitasking processor, and can update this table. Correlations can be periodically computed in batches. In some embodiments, batches can be accumulated as long as the attenuator settings are constant during the batch.

In various embodiments, phase and/or gain corrections can be computed from the accumulated correlations. Variance of the correction estimates can also be computed based on the total accumulated correlation power. When the variance drops below a threshold, the lookup table can be updated, for example because the corrections are expected to be accurate. In an embodiment, while the gain correction is updated completely, the phase offset correction is only updated by 50%, for example due to analog correction circuit variations. In some embodiments, the partial corrections converge to an exact value with a few iterations.

In an embodiment, group delay is not tracked. In some such embodiments, phase and gain tracking will substantially compensate for group delay mismatch effect around the band of the TX signal. In some embodiments, such as for wideband signals, group delay tracking can improve IRR performance.

In an embodiment, the baseband filters 308 and 314 can be omitted from the model 800B shown in FIG. 8B, and group delay terms added for I- and Q-paths: $xe^{-i\omega\tau}$. In an embodiment, group delay can correspond to a different phase value in each path in the frequency domain. A fast-Fourier transform (FFT) of 12-pt cross-correlations can be used to estimate the phase response at various frequency bins for each path. A least-squares linear fit to the measured phase difference $\omega \times (\tau_I - \tau_Q)$ can be used to estimate the group delay error $(\tau_I - \tau_Q)$.

In another embodiment, a direct conversion architecture can include LO-leakage. In an embodiment, the LO-leakage can be removed during the QEC process. For example, TX LO-leakage can be modeled as a constant DC term $T_I + jT_Q$ added to the TX baseband signal. Referring back to FIG. 8A, the QEC controller 110 can measure input and output DC values by averaging ($\mu X_I, \mu X_Q$ and $\mu Y_I, \mu Y_Q$). The QEC controller 110 can then invert the loopback path a switch and again measure DC output ($\mu Y_{2I}, \mu Y_{2Q}$). Subtraction of the two measurements cancels the RX LO-leakage term.

In an embodiment, a digitally pre-applied TX LO-leakage correction term $C_I + j\,C_Q$ cancels TX LO-leakage. The QEC controller 110 can calculate the correction term as shown in Equation 19:

$$\begin{bmatrix} C_I \\ C_Q \end{bmatrix} = \begin{bmatrix} \mu X_I \\ \mu X_Q \end{bmatrix} - \begin{bmatrix} a & b \\ c & d \end{bmatrix}^{-1} \begin{bmatrix} \mu Y_I - \mu Y_{2I} \\ \mu Y_Q - \mu Y_{2Q} \end{bmatrix} \quad (19)$$

In various embodiments, the methods described herein can be repeated for different bands of interest (e.g., subbands) and separate QEC correction phase/gain parameters can be used for each band. Such repetition can provide correction of quadrature errors that vary non-linearly over frequency. Moreover, repetition can increase effectiveness of the methods described herein when RX and TX baseband filters are not completely flat over the entire band. Repetition can also correct group delay via a phase correction that varies over the different sub-bands. Thus, in some embodiments, the QEC controller 110 can refrain from tracking group delay.

Figure 9:
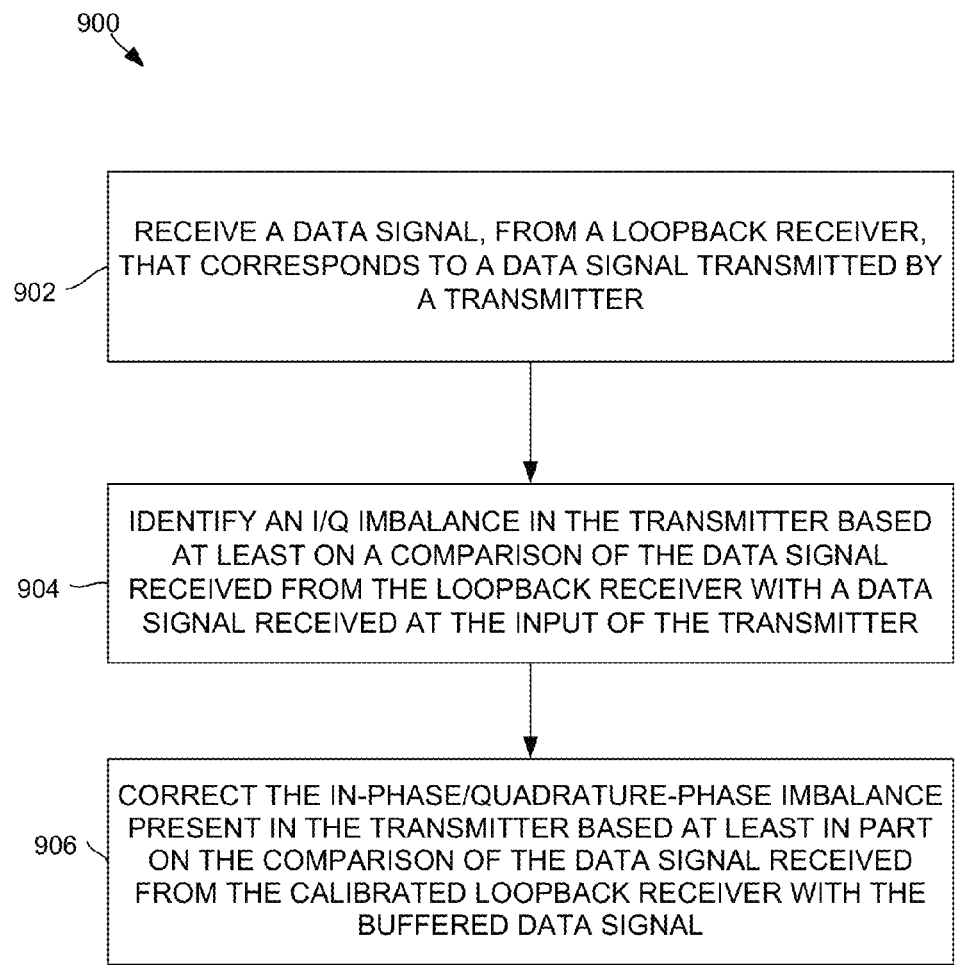
FIG. 9 shows a flowchart for an exemplary method of quadrature error correction that can be employed within the transmission module of FIG. 1.

FIG. 9 shows a flowchart 900 for an exemplary method of quadrature error correction that can be employed within the transmission module 100 of FIG. 1. The method can be implemented in whole or in part by the devices described herein, such as the transmission module 100, the QEC controller 110, the transmitter 102, etc. Although the illustrated method is described herein with reference to the transmission module 100 discussed above with respect to FIG. 1, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 902, the QEC controller 110 receives a first data signal, from a loopback receiver. In an embodiment, the first data signal corresponds to a second data signal transmitted by a transmitter. For example, the QEC controller 110 can receive the I-phase observed output Re{y(n)} and a Q-phase observed output Im{y(n)} signals from the loopback receiver 104, as discussed above with respect to FIG. 7. The I-phase observed output Re{y(n)} and a Q-phase observed output Im{y(n)} can correspond to the I-phase TX input Re{x(n)} and a Q-phase TX input Im{x(n)}.

Next, at block 904, the QEC controller 110 identifies an in-phase/quadrature-phase imbalance in the transmitter based at least on a comparison of the first data signal received from the loopback receiver with a buffered data signal that corresponds to a data signal received by the transmitter as an input. For example, the QEC controller 110 can perform channel estimation as discussed above with respect to FIG. 7 and the section titled "Channel Estimation" and/or FIGS. 8A-8B and the section titled "Digital Parameter QEC."

In an embodiment, the QEC controller 110 can identify the in-phase/quadrature-phase based on a cross-covariance of the first data signal received from the loopback receiver and the buffered data signal that corresponds to a data signal received by the transmitter. For example, the QEC controller 110 can calculate the MMSE estimate $\hat{H}$ based on the auto-covariance matrix of the input vector and the cross-covariance matrix of the output and input vectors.

In an embodiment, the QEC controller 110 can estimate low-rank signals using singular value decomposition. For example, the QEC controller 110 can perform singular value decomposition as discussed above with respect to FIG. 7 and the section titled "Channel Estimation."

Then, at block 906, the QEC controller 110 corrects the in-phase/quadrature-phase imbalance present in the transmitter based at least in part on the comparison of the first data signal received from the loopback receiver with the buffered data signal. For example, the QEC controller generate one or more correction parameters and transmit them to, for example, a QEC equalizer in the transmitter 102, one or more digital or analog gain blocks, one or more delay and/or phase tuning blocks, etc.

In an embodiment, the QEC controller 110 generates a precoder matrix configured to correct the I/Q imbalances. The QEC controller 110 can transmit one or more coefficients, or indications of coefficients, to a QEC equalizer configured to equalize the input signal within, or prior to entering, the transmitter 102. In an embodiment, the QEC controller 110 can generate the precoder matrix based on a cross-covariance of the first data signal received from the loopback receiver and the buffered data signal that corresponds to a data signal received by the transmitter. For example, the QEC controller 110 can generate the precoder matrix as discussed above in the section titled "Digital Equalization QEC."

In an embodiment, the QEC controller 110 generates one or more of a gain correction, phase correction, and group delay correction parameter. For example, the QEC controller 110 can generate the one or more correction parameters as discussed above in the sections titled "Digital Parameter QEC" and "Hybrid Digital-Analog QEC." For example, the QEC controller 110 can generate any of the gain correction term, the phase correction term, and/or the group-delay correction term.

In an embodiment, the QEC controller 110 can generate one or more of the gain correction, phase correction, and group delay correction parameter based on a minimum mean square error (MMSE) channel estimate. For example, the QEC controller 110 can generate one or more correction parameters based on the estimate Ĥ (discussed above with respect to the section titled "Channel Estimation" and Equations 2-11).

In an embodiment, the QEC controller 110 can generate one or more of the gain correction, phase correction, and group delay correction parameter based on a parameterized linear transformation. For example, the QEC controller 110 can generate the one or more correction parameters as discussed above in the sections titled "Digital Parameter QEC."

In an embodiment, the method shown in FIG. 9 can be implemented in a device that can include a QEC circuit, which can include a receiving circuit, an identifying circuit, and a correcting circuit. Those skilled in the art will appreciate that a device can have more components than the simplified wireless device described herein. The device described herein includes only those components useful for describing some prominent features of implementations within the scope of the claims.

The QEC circuit can be configured to receive the first data signal from the loopback receiver that corresponds to a data signal transmitted by the transmitter, identify the in-phase/quadrature-phase imbalance in the transmitter based at least on a comparison of the first data signal received from the loopback receiver with a buffered data signal that corresponds to the first data signal received by the transmitter, and/or correct the in-phase/quadrature-phase imbalance present in the transmitter based at least in part on the comparison of the first data signal received from the calibrated loopback receiver with the buffered data signal. In an embodiment, the QEC circuit can be configured to implement blocks 902-906 of the flowchart 900 (FIG. 9). The QEC circuit can include the QEC controller 110 alone or in combination with any other processor, DSP, FPGA, memory, etc. In some embodiments, the QEC circuit can include the receiving circuit, identifying circuit, and/or correcting circuit described herein. In some implementations, means for QEC can include the receiving circuit.

The receiving circuit can be configured to receive the first data signal from the loopback receiver that corresponds to a data signal transmitted by the transmitter. In an embodiment, the receiving circuit can be configured to implement block 902 of the flowchart 900 (FIG. 9). The receiving circuit can include the QEC controller 110 alone or in combination with any other processor, DSP, FPGA, memory, etc. In some implementations, means for receiving can include the receiving circuit.

The identifying circuit can be configured to identify the in-phase/quadrature-phase imbalance in the transmitter based at least on a comparison of the first data signal received from the loopback receiver with a buffered data signal that corresponds to the first data signal received by the transmitter. In an embodiment, the identifying circuit can be configured to implement block 904 of the flowchart 900 (FIG. 9). The identifying circuit can include the QEC controller 110 alone or in combination with any other processor, DSP, FPGA, memory, etc. In some implementations, means for identifying can include the identifying circuit.

The correcting circuit can be configured to correct the in-phase/quadrature-phase imbalance present in the transmitter based at least in part on the comparison of the first data signal received from the calibrated loopback receiver with the buffered data signal. In an embodiment, the correcting circuit can be configured to implement block 906 of the flowchart 900 (FIG. 9). The correcting circuit can include the QEC controller 110 alone or in combination with any other processor, DSP, FPGA, memory, etc. In some implementations, means for correcting can include the correcting circuit.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

A skilled artisan will appreciate that the configurations and principles of the embodiments can be adapted for any electronic system. The circuits employing the above described configurations can be implemented into various electronic devices or integrated circuits. Examples of the electronic devices can include, but are not limited to, consumer electronic products, parts of the consumer electronic products, electronic test equipment, etc. Further, the electronic device can include unfinished products. Furthermore, the various topologies, configurations and embodiments described above may be implemented discretely or integrated on a chip without departing from the spirit and scope of the description.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Embodiments are also described above with reference to flow chart illustrations and/or block diagrams of methods, and apparatus (systems). Each block of the flow chart illustrations and/or block diagrams, and combinations of blocks in the flow chart illustrations and/or block diagrams, may be implemented by computer program instructions stored in a tangible non-transitory computer-readable medium. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

Although this disclosure has been described in terms of certain embodiments, other embodiments that are apparent to those of ordinary skill in the art, including embodiments that do not provide all of the features and advantages set forth herein, are also within the scope of the disclosure. Moreover, the various embodiments described above can be combined to provide further embodiments. In addition, certain features shown in the context of one embodiment can be incorporated into other embodiments as well. Accordingly, the scope of the disclosure is defined only by reference to the appended claims.

What is claimed is:

1. A transmission module configured for in-phase/quadrature (I/Q) imbalance calibration by tuning a loopback receiver and using the tuned loopback receiver to correct I/Q imbalance in a transmitter, the transmission module comprising:
    a transmitter configured to provide an output to a power amplifier, the transmitter comprising an analog tuning circuit;
    a loopback receiver;
    a local oscillator delay tuner;
    a calibration phase locked loop (PLL) configured to generate a test data signal;
    a switch communicatively coupled to an input of the loopback receiver and configured to select, for an input for the loopback receiver, at least between the test data signal and the output of the transmitter; and
    a controller configured to:
        correct an in-phase/quadrature (I/Q) imbalance in the loopback receiver to provide a tuned loopback receiver based at least in part on a comparison of a first data signal received from the loopback receiver and the test data signal,
        correct a quadrature error in the loopback receiver by adjusting local oscillator phase delay using the local oscillator delay tuner,
        receive a second data signal from the tuned loopback receiver,
        based at least in part on the correction of the I/Q imbalance in the loopback receiver, identify an I/Q imbalance in the transmitter based at least in part on a comparison of the second data signal received from the tuned loopback receiver with a buffered data signal that corresponds to a data signal received by the transmitter as an input,
        correct the I/Q imbalance in the transmitter using the analog tuning circuit, and
        correct a quadrature error in the transmitter by adjusting local oscillator phase delay using the local oscillator delay tuner.

2. The transmission module of claim 1, wherein the controller is configured to correct the I/Q imbalance in the transmitter based at least in part on a cross-covariance of the first data signal received from the loopback receiver and the buffered data signal that corresponds to the data signal received by the transmitter.

3. The transmission module of claim 1, wherein the controller is further configured to estimate low-rank signals using singular value decomposition.

4. The transmission module of claim 1, wherein the controller is further configured to generate a precoder matrix configured to correct the I/Q imbalance in the transmitter.

5. The transmission module of claim 4, wherein the controller is configured to generate the precoder matrix based at least in part on a cross-covariance of the second data signal received from the tuned loopback receiver and the buffered data signal that corresponds to the data signal received by the transmitter.

6. The transmission module of claim 1, wherein the controller is configured to generate at least one of a gain correction, phase correction, or group delay correction parameter based at least in part on a parameterized linear transformation.

7. The transmission module claim 1, wherein the controller is configured to compute a matrix $$R = \begin{vmatrix} R_{11} & R_{12} \\ 0 & R_{22} \end{vmatrix}$$

as $\hat{H} = Q \times R$, where Q is a rotation matrix representing a phase rotation due to a local oscillator phase offset, and $\hat{H}$ is the transmitter to loopback receiver channel estimate.

8. The transmission module claim 7, wherein the controller is configured to perform at least one of:
    determine a gain correction parameter as $C_G \approx R_{22}/R_{11}$, where $R_{22}$ refers to a second row, second column of the matrix R, and $R_{11}$ refers to a first row, first column of the matrix R;
    determine a phase correction as $C_P \approx R_{12}/R_{11}$, where $R_{12}$ refers to the first row, second column of the matrix R, and $R_{11}$ refers to the first row, first column of the matrix R; and
    determine a group-delay correction term $C_D$ based at least in part on a time-shift between $\hat{H}_{11}$ and $\hat{H}_{22}$, where $\hat{H}_{11}$ refers to a first row, first column of a matrix $\hat{H}$, and $\hat{H}_{22}$ refers to a second row, second column of the matrix $\hat{H}$.

9. The transmission module of claim 1, wherein the switch is configured to:
    receive the output from the transmitter at a point prior to the power amplifier and receive the test data signal, output, during a first time period, the test data signal to the loopback receiver, and output, during a second time period and based at least in part on a determination that the I/Q imbalance in the loopback receiver has been corrected, the output of the transmitter to the tuned loopback receiver, wherein the second data signal output by the transmitter is received by the power amplifier for transmission via an antenna and by the switch for communication to the tuned loopback receiver.

10. The transmission module of claim 1, wherein the PLL is configured to vary a frequency of the test data signal across a transmit band for correction of the I/O imbalance in the loopback receiver.

11. The transmission module of claim 1, wherein the second data signal output by the transmitter is received by the power amplifier for transmission via an antenna and by the switch for communication to the tuned loopback receiver.

12. The transmission module of claim 1, wherein the I/Q imbalance in the loopback receiver is corrected during a first time period and the I/Q imbalance in the transmitter is corrected during a second time period that is after and does not overlap with the first time period.

13. The transmission module of claim 1, wherein the controller corrects the I/O imbalance in the transmitter using the analog tuning circuit based at least in part on a determination that at least one of the I/O imbalance in the transmitter is caused by one or more baseband filters of the transmitter or the I/O imbalance in the transmitter is frequency independent.

14. The transmission module of claim 1, further comprising a local oscillator configured to provide a local oscillator input to the transmitter and the loopback receiver.

15. The transmission module of claim 1, further comprising a local oscillator configured to provide the same local oscillator input to the transmitter and loopback receiver.

16. The transmission module of claim 1, wherein the guadrature error in the loopback receiver is a local oscillator phase error and the guadrature error in the transmitter is a local oscillator phase error.

17. An electronically-implemented method of quadrature error correction of a transmitter during use of the transmitter for wireless transmission, the method comprising:
    receiving a first data signal from a loopback receiver, wherein an input of the loopback receiver is communicatively coupled to a switch, wherein the switch is configured to select, for the input of the loopback receiver, at least between a test data signal generated by a phase locked loop (PLL) and an output of a transmitter, the transmitter comprising an analog tuning circuit;
    correcting an in-phase/quadrature (I/O) imbalance in the loopback receiver to provide a tuned loopback receiver based at least in part on a comparison of the first data signal and the test data signal;
    correcting a quadrature error in the loopback receiver by adjusting local oscillator phase delay using a local oscillator delay tuner;
    based at least in part on the correcting the I/O imbalance in the loopback receiver, receiving a second data signal from the tuned loopback receiver, the tuned loopback receiver configured to receive the output of the transmitter;
    identifying an I/O imbalance in the transmitter based at least in part on a comparison of the second data signal received from the tuned loopback receiver with a buffered data signal that corresponds to a data signal received by the transmitter;
    correcting the I/O imbalance in the transmitter using the analog tuning circuit; and
    correcting a quadrature error in the transmitter by adjusting local oscillator phase delay using the local oscillator delay tuner.

18. The method of Claim 10, further comprising identifying the I/Q imbalance in the transmitter based at least in part on a cross-covariance of the first data signal received from the loopback receiver and the buffered data signal that corresponds to the data signal received by the transmitter.

19. The method of Claim 17, further comprising estimating low-rank signals using singular value decomposition.

20. The method of Claim 17, further comprising generating at least one of a gain correction, phase correction, or group delay correction parameter based at least in part on a parameterized linear transformation.

21. The method of Claim 17, further comprising correcting a local oscillator phase delay, at the transmitter and the loopback receiver, via a local oscillator delay tuner.

22. An apparatus comprising:
    a transmitter configured to provide an output to a power amplifier, the transmitter comprising an analog tuning circuit;
    a loopback receiver configured to receive the output from the transmitter; and
    a means for quadrature error correction comprising:
    a means for receiving a first data signal from the loopback receiver that corresponds to a second data signal generated by the transmitter as an output,
    a means for identifying an in-phase/quadrature imbalance in the transmitter based at least on a comparison of the first data signal received from the loopback receiver with a buffered data signal that corresponds to a data signal received by the transmitter, and
    a means for correcting the in-phase/quadrature imbalance in the transmitter based at least in part on adjusting a group delay via the analog tuning circuit.

23. The apparatus of claim 22, further comprising a local oscillator delay tuner configured to correct local oscillator phase delay at the transmitter and the loopback receiver.

24. The apparatus of claim 23, wherein the means for identifying an in-phase/quadrature imbalance in the transmitter based at least on a comparison of the first data signal received from the loopback receiver with a buffered data signal that corresponds to a data signal further comprises computing a matrix $$R = \begin{vmatrix} R_{11} & R_{12} \\ 0 & R_{22} \end{vmatrix}$$

as $\hat{H}=Q \times R$, where Q is a rotation matrix representing a phase rotation due to a local oscillator phase offset, and $\hat{H}$ is the transmitter to loopback receiver channel estimate.

25. The apparatus of claim 23, wherein the means for correcting the in-phase/quadrature imbalance present in the transmitter based at least in part on adjusting a group delay via the analog tuning circuit further comprises at least one of:
    determining a gain correction parameter as $C_G \approx R_{22}/R_{11}$, where $R_{22}$ refers to a second row, second column of the matrix R, and $R_{11}$ refers to a first row, first column of the matrix R;
    determining a phase correction as $C_P \cdot R_{12}/R_{11}$, where $R_{12}$ refers to the first row, second column of the matrix R, and $R_{11}$ refers to the first row, first column of the matrix R; and
    determining a group-delay correction term $C_D$ based at least in part on a time-shift between fill and $\hat{H}_{22}$, where $\hat{H}_{11}$ refers to a first row, first column of a matrix $\hat{H}$, and $\hat{H}_{22}$ refers to a second row, second column of the matrix $\hat{H}$.

26. A non-transitory computer-readable medium comprising
    computer-executable instructions for calibrating a transmitter during use of the transmitter for wireless transmission that, when executed by one or more processors, cause the one or more processors to:

receive a first data signal from a loopback receiver, wherein an input of the loopback receiver is communicatively coupled to a switch, wherein the switch is configured to select, for the input of the loopback receiver, at least between a test data signal generated by a phase locked loop (PLL) and an output of a transmitter, the transmitter comprising an analog tuning circuit;

correct an in-phase/quadrature (I/Q) imbalance in the loopback receiver to provide a tuned loopback receiver based at least in part on a comparison of the first data signal and the test data signal;

correct a quadrature error in the loopback receiver by adjusting local oscillator phase delay using a local oscillator delay tuner;

based at least in part on the correction of the I/O imbalance in the loopback receiver, receive a second data signal from the tuned loopback receiver, the tuned loopback receiver configured to receive the output of the transmitter;

identify an in-phase/quadrature imbalance in the transmitter based at least in part on a comparison of the second data signal received from the tuned loopback receiver with a buffered data signal that corresponds to a data signal received by the transmitter;

correct the in-phase/quadrature imbalance present in the transmitter using the analog tuning circuit; and correct a quadrature error in the transmitter by adjusting local oscillator phase delay using the local oscillator delay tuner.

* * * * *

UNITED STATES PATENT AND TRADEMARK OFFICE
CERTIFICATE OF CORRECTION

PATENT NO. : 11,012,201 B2
APPLICATION NO. : 14/340461
DATED : May 18, 2021
INVENTOR(S) : Raju Hormis It is certified that error appears in the above-identified patent and that said Letters Patent is hereby corrected as shown below:

On the Title Page

Column 2, Item (57), Line 4, under Abstract, delete "one a" and insert --one of a--.

On Page 2, Column 1, Item (56), Line 36, under U.S. Patent Documents, delete "Hideharu" and insert --Shako--.

On Page 2, Column 2, Item (56), Line 14, under Other Publications, delete "SCOMA" and insert --SCDMA--.

In the Specification

In Column 1, Line 21, delete "transmitters" and insert --transmitters.--.

In Column 1, Line 32, delete "7an" and insert --an--.

In Column 4, Line 53, delete "and Ser. No." and insert --and--.

In Column 18, Line 67, delete "H22" and insert --$H_{22}$--.

In Column 20, Line 26, delete "a tan" and insert --atan--.

In the Claims

In Column 26, Claim 7, Line 25, delete "claim" and insert --of claim--.

In Column 26, Claim 8, Line 36, delete "claim" and insert --of claim--.

In Column 26, Claim 8, Line 42, delete "*where R*12" and insert --where $R_{12}$--.

Signed and Sealed this
            Fourth Day of January, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,012,201 B2

In Column 26, Claim 8, Line 48, delete "$\hat{H}_{11}$refers" and insert --$\hat{H}_{11}$ refers--.

In Column 26, Claim 8, Line 49, delete "$\hat{H}_{22}$refers" and insert --$\hat{H}_{22}$ refers--.

In Column 26, Claim 10, Line 66, delete "I/O" and insert --I/Q--.

In Column 27, Claim 13, Line 12, delete "I/O" and insert --I/Q--.

In Column 27, Claim 13, Line 14, delete "I/O" and insert --I/Q--.

In Column 27, Claim 13, Line 16, delete "I/O" and insert --I/Q--.

In Column 27, Claim 16, Line 25, delete "guadrature" and insert --quadrature--.

In Column 27, Claim 16, Line 26, delete "guadrature" and insert --quadrature--.

In Column 27, Claim 17, Line 39, delete "I/O" and insert --I/Q--.

In Column 27, Claim 17, Line 46, delete "I/O" and insert --I/Q--.

In Column 27, Claim 17, Line 51, delete "I/O" and insert --I/Q--.

In Column 27, Claim 17, Line 56, delete "I/O" and insert --I/Q--.

In Column 27, Claim 18, Line 61, delete "Claim 10" and insert --Claim 10,--.

In Column 28, Claim 25, Line 53, delete "$C_p$'" and insert --$C_P \approx$--.

In Column 28, Claim 25, Line 58, delete "fill'" and insert --$\hat{H}_{11}$--.

In Column 28, Claim 25, Line 59, delete "$\hat{H}_{11}$refers" and insert --$\hat{H}_{11}$ refers--.

In Column 28, Claim 25, Line 60, delete "$\hat{H}_{22}$refers" and insert --$\hat{H}_{22}$ refers--.

In Column 29, Claim 26, Line 15, delete "I/O" and insert --I/Q--.